United States Patent
Zhu et al.

(10) Patent No.: US 11,159,214 B2
(45) Date of Patent: Oct. 26, 2021

(54) WIRELESS COMMUNICATIONS SYSTEM, A RADIO NETWORK NODE, A MACHINE LEARNING UNT AND METHODS THEREIN FOR TRANSMISSION OF A DOWNLINK SIGNAL IN A WIRELESS COMMUNICATIONS NETWORK SUPPORTING BEAMFORMING

(71) Applicant: Telefonaktiebolaget LM Ericsson (publ), Stockholm (SE)

(72) Inventors: Huaisong Zhu, Beijing (CN); Hugo Tullberg, Nyköping (SE); Zhan Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/758,254

(22) PCT Filed: Dec. 22, 2017

(86) PCT No.: PCT/CN2017/118087
§ 371 (c)(1),
(2) Date: Apr. 22, 2020

(87) PCT Pub. No.: WO2019/119442
PCT Pub. Date: Jun. 27, 2019

(65) Prior Publication Data
US 2020/0313741 A1    Oct. 1, 2020

(51) Int. Cl.
*H04B 7/06* (2006.01)
*H04B 7/024* (2017.01)

(52) U.S. Cl.
CPC .......... *H04B 7/0617* (2013.01); *H04B 7/024* (2013.01); *H04B 7/0619* (2013.01)

(58) Field of Classification Search
CPC .... H04W 16/28; H04W 24/10; H04B 7/0617; H04B 7/0695; H04B 7/024; H04B 7/0619; G06N 3/0454
See application file for complete search history.

(56) References Cited

U.S. PATENT DOCUMENTS

| 2007/0207730 A1 | 9/2007 | Nguyen et al. |
| 2013/0070827 A1 | 3/2013 | Li et al. |

(Continued)

FOREIGN PATENT DOCUMENTS

| EP | 2930966 A1 | 10/2015 |
| WO | 2014173301 A1 | 10/2014 |
| WO | 2016086144 A1 | 6/2016 |

OTHER PUBLICATIONS

Kavak, Adnan, et al., "Using Adaline Neural Network for Performance Improvement of Smart Antennas in TDD Wireless Communications", IEEE Transactions on Neural Networks, vol. 16, No. 6, Nov. 2005, pp. 1616-1625.

(Continued)

*Primary Examiner* — Sung S Ahn
(74) *Attorney, Agent, or Firm* — Sage Patent Group

(57) ABSTRACT

A wireless communications system (10) and a method therein for transmission of a downlink signal in a wireless communications network (100) supporting beamforming. The system estimates uplink channel information for a radio link from a wireless device (120) to a radio network node (110). Further, the system obtains downlink beamforming information related to the estimated uplink channel information from a machine learning unit (300). The machine learning unit comprises relationships between beamforming information and uplink channel information determined based on stored pairs of reported downlink beamforming information and measured uplink channel information. The obtained downlink beamforming information is applicable (Continued)

for the radio cell sector. Furthermore, the system transmits, towards the wireless device (120), a beamformed downlink signal using the obtained downlink beamforming information.

20 Claims, 10 Drawing Sheets

(56) References Cited

U.S. PATENT DOCUMENTS

| | | | |
|---|---|---|---|
| 2015/0349863 A1* | 12/2015 | El Ayach | H04B 7/0404 375/295 |
| 2016/0316465 A1 | 10/2016 | Sahlin et al. | |
| 2017/0311187 A1 | 10/2017 | Dong et al. | |
| 2017/0331670 A1 | 11/2017 | Parkvall et al. | |
| 2018/0262918 A1* | 9/2018 | Zhao | H04B 7/0695 |
| 2019/0190569 A1* | 6/2019 | Nayeb Nazar | H04B 7/0417 |

OTHER PUBLICATIONS

Abboud, Ahmad, et al., "Indoor Massive MIMO: Uplink Pilot Mitigation Using Channel State Information Map", 2016 IEEE International Conference on Computational Science and Engineering, IEEE International Conference on Embedded and Ubiquitous Computing, and International Symposium on Distributed Computing and Applications to Business, Engineering and Science, 2016, pp. 452-458.

Cheng, Xiantao, et al., "Spatially Sparse Beamforming Training for Millimeter Wave MIMO Systems", IEEE Transactions on Wireless Communications, vol. 16, No. 5, May 2017, pp. 3385-3400.

Garcia, L. Garcia, et al., "Implementation of a Neural Network-Based Digital Beamformer for a UMTS Smart Antenna", 2004 IEEE Sensor Array and Multichannel Signal Processing Workshop, 2004, pp. 119-123.

* cited by examiner

Carrier Frequency   2 GHz (DL), 1,8 GHz (UL)
Bandwidth  20 MHz

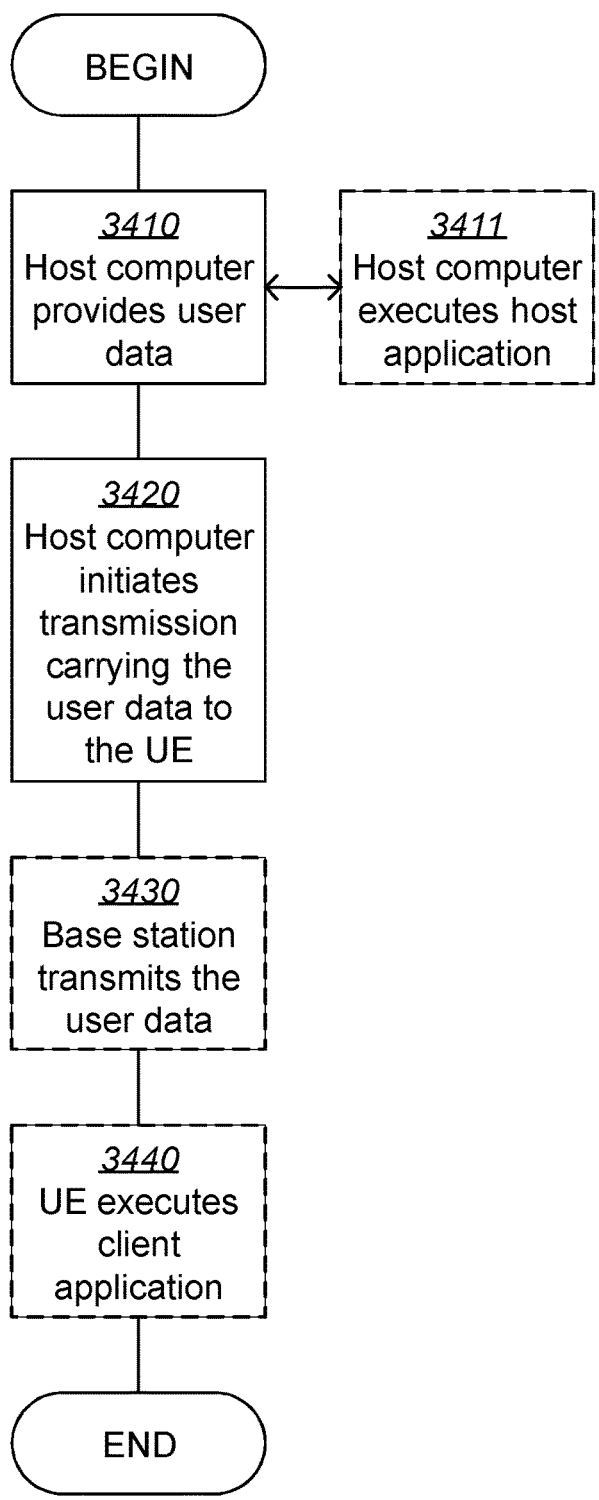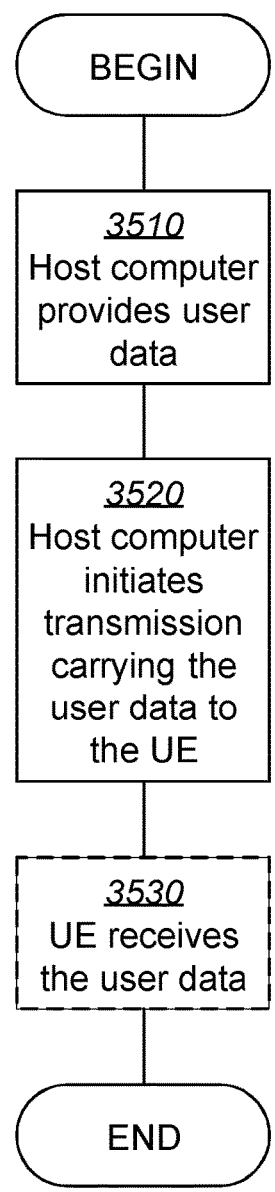
FIG. 10
FIG. 11

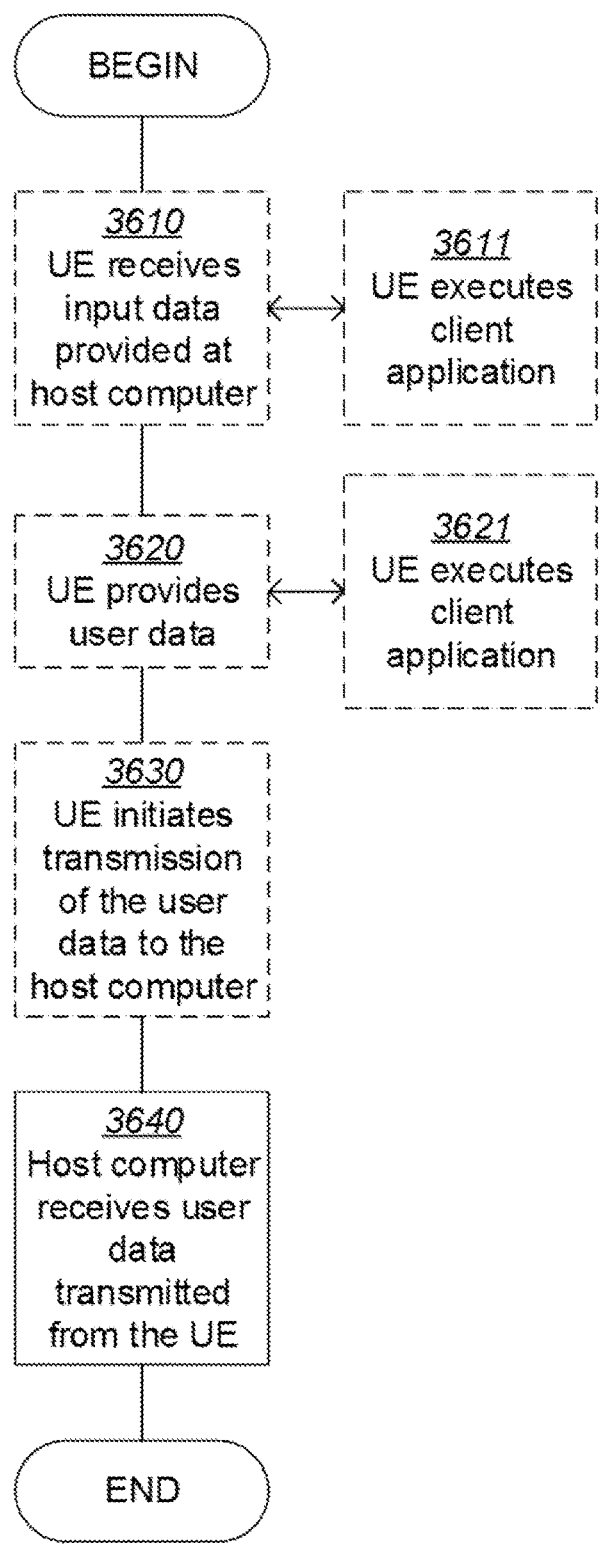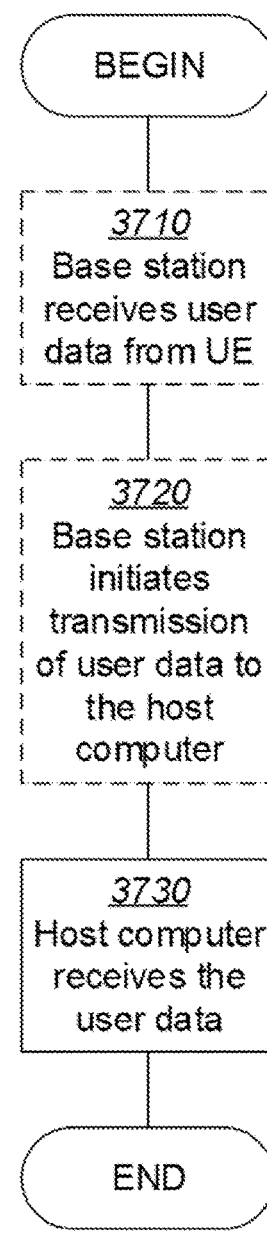
FIG. 12
FIG. 13

WIRELESS COMMUNICATIONS SYSTEM, A RADIO NETWORK NODE, A MACHINE LEARNING UNT AND METHODS THEREIN FOR TRANSMISSION OF A DOWNLINK SIGNAL IN A WIRELESS COMMUNICATIONS NETWORK SUPPORTING BEAMFORMING

TECHNICAL FIELD

Embodiments herein relate generally to a wireless communications system, a radio network node, a machine learning unit and to methods therein. In particular, embodiments relate to transmission of a downlink signal in a wireless communications network supporting beamforming.

BACKGROUND

In a typical wireless communication network, wireless devices, also known as wireless communication devices, mobile stations, stations (STA) and/or User Equipments (UEs), communicate via a Local Area Network such as a WiFi network or a Radio Access Network (RAN) to one or more Core Networks (CN). The RAN covers a geographical area which is divided into service areas or cell areas, which may also be referred to as a beam or a beam group, with each service area or cell area being served by a radio network node such as a radio access node e.g., a Wi-Fi access point or a Radio Base Station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques used in Advanced Antenna Systems (AAS) can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO systems.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Development of next generation wide area communications networks is in progress. The next generation wide area communications networks may be referred to as NeXt generation (NX) communications networks, NR communications networks, or 5G communications networks. A design principle under consideration for 5G wireless communication networks is to base it on an ultra-lean design. This implies that "always on signals", such as the reference signals used in LTE, shall be avoided in the communications network as much as possible. Expected benefits from this design principle comprise e.g. significantly lower network energy consumption, better scalability, higher degree of forward compatibility, lower interference from system overhead signals and consequently higher throughput in low load scenarios, and also improved support for wireless device, or so called user, centric beamforming. By the expression "wireless device centric beamforming" is means that the beamforming is selected based on the requirements or needs of the wireless device.

The advanced antenna systems is an area where technology has advanced significantly in recent years and where a rapid technology development is foreseen in the years to come. Advanced antenna systems in general and massive MIMO transmission and reception will likely be used in future wireless communication networks and in the 5G wireless communication networks.

A beam is traditionally associated with transmission using so called beamforming, typically by means of a phase-adjustable, or phased, antenna array, the same underlying technique is equally applicable to reception. Beamforming, or spatial filtering, may be described as a signal processing technique for directional signal transmission and/or reception. This is typically achieved by combining elements in the phased antenna array, often referred to simply as a phased array, in such a way that signals at particular angles experience constructive interference while others experience destructive interference. Beamforming can be used at both the transmitting and receiving ends in order to achieve spatial selectivity. Thereby, thanks to directivity, improvements are possible to achieve compared with omnidirectional reception/transmission. For example, a transmitter may perform transmit beamforming by transmitting the same signal on all elements of a phased array, except for a per-element weight comprising a phase shift and an amplitude factor. Similarly, a receiver with an phased array, that may be the same and/or configured in the same way as of the transmitter, may perform receive beamforming by applying per-element weights and adding the resulting signals before further processing. The selectivity and directivity may thus be the same in transmission and reception. For transmission, it means that the signal will be stronger in some direction or directions and weaker in others. For reception, it means that signals from some direction or directions are amplified and those from other directions are attenuated, relative to each other. The same antenna may be used, i.e. operated, for transmission and reception although typically not at the same time.

Beams and beamforming may be applied in the uplink and/or downlink, and at both communication ends or only at one communication end. For example, in the downlink regarding communication between a wireless communication network and a communication device, the wireless communication network may uses transmit beamforming and/or the communication device may use receive beamforming. Correspondingly, in the uplink regarding communication between a wireless communication network and a communication device, the wireless communication network may uses receive beamforming and/or the communication device may use transmit beamforming. Synonymous naming for transmit beamforming may be transmission beamforming or transmitting beamforming and synonymous naming for receive beamforming may be reception beamforming or receiving beamforming. Conventionally when referring to a beam, a transmit beam is meant, i.e. a radio beam formed and/or generated by transmit beamforming. However, as can be realized from above, it can as well make sense to refer to receive beams, i.e. beams associated with receive beamforming. Herein, "beam" typically refers to a transmit beam if nothing else is indicated, as should be recognized by the skilled person.

A beam provided by a network node is typically for communication with, e.g. for serving, one or a few (compared to a cell) communication devices at the same time, and may be specifically set up for communication with these. The beam may be changed dynamically by beamforming to provide desirable coverage for the one or few communication devices communicating using, e.g. being served by, the beam. A beam provided by a communication device is typically for communication with the wireless communication network, particularly one or a few radio network nodes thereof, typically one, or at least one, that is a main target for the beam.

A transmit beam may be associated with one or more identifiers and/or identities, which may by fix and/or dynamically assigned. There may be identifiers and/or identities that are the same for a set or group of beams, i.e. multiple beams, e.g. corresponding to a cell identity that is the same for all of said multiple beams, e.g. those within a cell, and/or there may be others that identify an individual beam, e.g. an individual beam within a cell or group of beams. A beam identifier and/or beam identity may directly identify the beam, and may e.g. be transmitted in the beam, and/or may indirectly identify the beam, e.g. by referring to the time and/or frequency of a received reference signal transmitted using that beam.

Beamforming may improve performance both by increasing the received signal strength, thereby improving the coverage, and by reducing unwanted interference, thereby improving the capacity. Beamforming may be applied both in a transmitter and a receiver of a radio network node and/or wireless device. In a transmitter, beamforming may amount to configuring the transmitter to transmit the signal in a specific direction, or a few directions, and not in other directions. In a receiver, beamforming may amount to configuring the receiver to only receive signals from a certain direction, or a few directions, and not from other directions. When beamforming is applied in both the transmitter and the receiver for a given communication link, the beam pair may be referred to as the beams selected in the both ends. Generally, the beamforming gains are related to the widths of the used beams, where a relatively narrow beam provides more gain than a wider beam.

One important feature supported by the 5G communications networks is extremely high-grade spatial transmissions and processing, i.e., the support of massive MIMO.

To support beamforming on massive MIMO, the 3GPP defines a complex codebook for beamforming, which codebook comprises hundreds of Precoder Matrix indicators (PMIs). Thus, the 3GPP defines a set of possible pre-coders, e.g. vectors, and collect them as a 'code-book'. Further, the 3GPP index each pre-coder in the codebook with an integral number, normally in the range from zero to several tens or hundreds. In the standard, the integral number is referred to as the PMI.

Each pre-coder may be mapped with a certain direction plus phases between polarizations. If a wireless device is located in a given direction and matches in phases between polarizations, the wireless device will report the corresponding PMI to the eNB serving the wireless device. The eNB, e.g. the gNB, normally follows the wireless device's reports, and beamforms its transmissions to send a signal to the wireless device in the given direction and with the proper phases in polarizations.

An alternative method for DL beamforming is based on one or more uplink measurements. For example, in a Time Division Duplex (TDD) based communications system, UL and DL signals are transmitted on the same carrier frequency, but in adjacent time slots. Therefore, the eNB may assume that the measured uplink channel is exactly the same as the DL channel, and for the DL channel, the beamforming precoder may be calculated or selected based on the eNB's measurement of the UL channel. This is a so-called "channel reciprocity based method", which sometimes in this disclosure is referred to as "an eNB measurement based DL beamforming" in contrast to the wireless device measurements and reporting based on DL beamforming.

SUMMARY

According to developments of wireless communications systems an improved beamforming procedure is needed for improving the performance of the wireless communications system.

Therefore, an object of embodiments herein is to overcome the above-mentioned drawbacks among others and to improve the performance in a wireless communications system.

According to an aspect of embodiments herein, the object is achieved by a method performed in a wireless communications system for transmission of a downlink signal in a wireless communications network supporting beamforming.

The system estimates, in a radio network node, uplink channel information for a radio link from a wireless device to the radio network node, wherein the wireless device is operating within a radio cell sector comprised in the wireless communications network.

Further, the system obtains downlink beamforming information related to the estimated uplink channel information from a machine learning unit. The machine learning unit comprises relationships between beamforming information and uplink channel information determined based on stored pairs of reported downlink beamforming information and measured uplink channel information. The obtained downlink beamforming information is applicable for the radio cell sector.

Furthermore, the system transmits, from the radio network node towards the wireless device, a beamformed downlink signal using the obtained downlink beamforming information.

According to another aspect of embodiments herein, the object is achieved by a wireless communications system for transmission of a downlink signal in a wireless communications network is configured to support beamforming.

The system is configured to estimate, in a radio network node, uplink channel information for a radio link from a wireless device to the radio network node, wherein the wireless device is configured to operate within a radio cell sector comprised in the wireless communications network.

Further, the system is configured to obtain downlink beamforming information related to the estimated uplink channel information from a machine learning unit. The machine learning unit is configured to comprise relationships between beamforming information and uplink channel information determined based on stored pairs of reported downlink beamforming information and measured uplink channel information. The obtained downlink beamforming information is applicable for the radio cell sector.

Furthermore, the system is configured to transmit, from the radio network node towards the wireless device, a beamformed downlink signal using the obtained downlink beamforming information.

According to another aspect of embodiments herein, the object is achieved by a method performed in a radio network node for transmission of a downlink signal in a wireless communications network supporting beamforming.

The radio network node estimates uplink channel information for a radio link from a wireless device to the radio network node, wherein the wireless device is operating within a radio cell sector comprised in the wireless communications network.

Further, the radio network node obtains downlink beamforming information related to the estimated uplink channel information from a machine learning unit comprising relationships between beamforming information and uplink channel information determined based on stored pairs of reported downlink beamforming information and measured uplink channel information. The obtained downlink beamforming information is applicable for the radio cell sector.

Furthermore, the radio network node transmits, towards the wireless device, a beamformed downlink signal using the obtained downlink beamforming information.

According to another aspect of embodiments herein, the object is achieved by a radio network node for transmission of a downlink signal in a wireless communications network configured to support beamforming.

The radio network node is configured to estimate uplink channel information for a radio link from a wireless device to the radio network node, wherein the wireless device is configured to operate within a radio cell sector comprised in the wireless communications network.

Further, the radio network node is configured to obtain downlink beamforming information related to the estimated uplink channel information from a machine learning unit comprising relationships between beamforming information and uplink channel information determined based on stored pairs of reported downlink beamforming information and measured uplink channel information. The obtained downlink beamforming information is applicable for the radio cell sector.

Furthermore, the radio network node is configured to transmit, towards the wireless device, a beamformed downlink signal using the obtained downlink beamforming information According to another aspect of embodiments herein, the object is achieved by a method performed in a machine learning unit for supporting transmission of a downlink signal in a wireless communications network supporting beamforming.

The machine learning unit trains to determine relationships between downlink beamforming information and uplink channel information based on stored pairs of reported downlink beamforming information and measured uplink channel information by performing a neural network method on stored pairs of reported downlink beamforming information and measured uplink channel information.

Further, the machine learning unit retrieves downlink beamforming information related to received estimated uplink channel information for a radio link between a wireless device and radio network node. The downlink beamforming information is retrieved based on the determined relationships and wherein the downlink beamforming information is applicable for a radio cell sector comprised in the wireless communications network.

Furthermore, the machine learning unit provides the obtained downlink beamforming information to a radio network node, thereby supporting the radio network node to transmit, towards the wireless device operating within the radio cell sector, a beamformed downlink signal using the downlink beamforming information.

According to another aspect of embodiments herein, the object is achieved by a machine learning unit for supporting transmission of a downlink signal in a wireless communications network configured to support beamforming.

The machine learning unit is configured to train to determine relationships between downlink beamforming information and uplink channel information based on stored pairs of reported downlink beamforming information and measured uplink channel information by performing a neural network method on stored pairs of reported downlink beamforming information and measured uplink channel information.

Further, the machine learning unit is configured to retrieve downlink beamforming information related to received estimated uplink channel information for a radio link between a wireless device and radio network node. The downlink beamforming information is retrieved based on the determined relationships and wherein the downlink beamforming information is applicable for a radio cell sector comprised in the wireless communications network.

Furthermore, the machine learning unit is configured to provide the obtained downlink beamforming information to a radio network node, thereby supporting the radio network node to transmit, towards the wireless device operating within the radio cell sector, a beamformed downlink signal using the downlink beamforming information.

According to another aspect of embodiments herein, the object is achieved by a computer program, comprising instructions which, when executed on at least one processor, causes the at least one processor to carry out the method performed by the wireless communications system.

According to another aspect of embodiments herein, the object is achieved by a computer program, comprising instructions which, when executed on at least one processor, causes the at least one processor to carry out the method performed by the radio network node.

According to another aspect of embodiments herein, the object is achieved by a computer program, comprising instructions which, when executed on at least one processor, causes the at least one processor to carry out the method performed by the machine learning unit.

According to another aspect of embodiments herein, the object is achieved by a carrier comprising the computer program, wherein the carrier is one of an electronic signal, an optical signal, a radio signal or a computer readable storage medium.

Since the system obtains downlink beamforming information related to the estimated uplink channel information from the machine learning unit that comprises relationships, e.g. trained relationships, between beamforming information and uplink channel information determined based on stored pairs of reported downlink beamforming information and measured uplink channel information, radio resources otherwise needed for transmitting downlink reference signals to be used to determine downlink beamforming information will be reduced. Therefore, a more efficient use of the radio spectrum is provided. This results in an improved performance in the wireless communications system.

An advantage with embodiments herein is that they can be extended to massive MIMO application scenarios in different generations of RANs, such as 4,5G, 5G and future generation RAN, for both high capability UEs and legacy UEs, and for an increasingly large number of antenna arrays at the RAN.

A further advantage with embodiments herein is that a well-trained machine learning unit helps the wireless communications system, e.g. the radio network node, to avoid some downlink beamforming reports from the wireless device and to avoid overhead from all corresponding downlink reference signals. This may be the case for at least for DL traffic heavy periods. Training data may be re-collected, stored and used for possible periodic offline training.

A yet further advantage with embodiments herein is that training execution that may require high computational complexity may be done externally of the radio network node, e.g. in an external node or cloud, or internally of the radio network node during idle periods of time for the radio network node.

BRIEF DESCRIPTION OF DRAWINGS

Examples of embodiments herein will be described in more detail with reference to attached drawings in which:

FIGS. 10 to 13 are flowcharts illustrating methods implemented in a communication system including a host computer, a base station and a user equipment.

DETAILED DESCRIPTION

Figure 1:
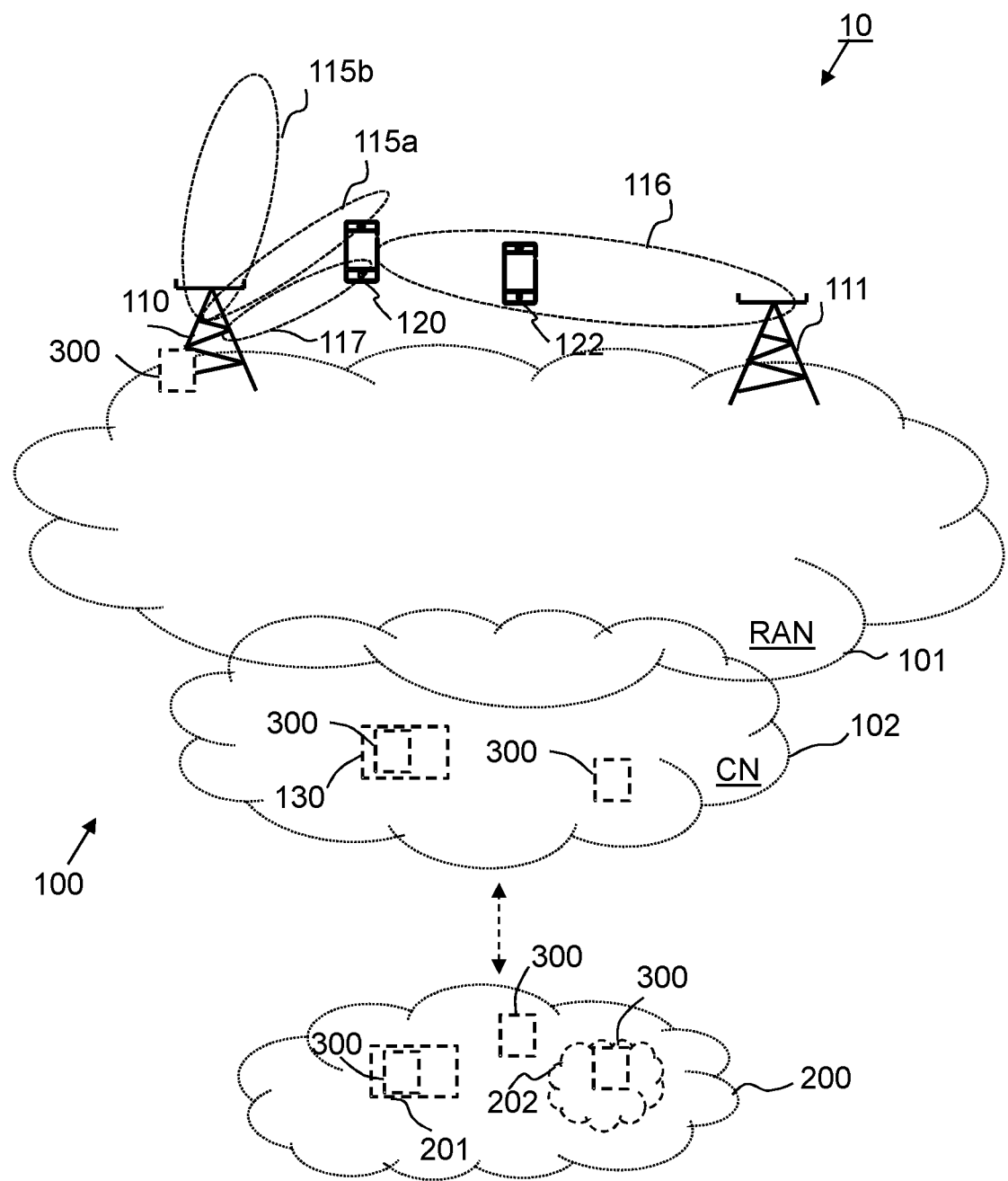
FIG. 1 is a schematic block diagram illustrating embodiments of a wireless communications system.

Throughout the following description similar reference numerals may be used to denote similar elements, units, modules, circuits, nodes, parts, items or features, when applicable. In the Figures, features that appear only in some embodiments are typically indicated by dashed lines.

In the following, embodiments herein are illustrated by exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

As part of developing embodiments herein, some drawbacks with the state of the art communications networks will first be identified and discussed. Both the PMI based DL beamforming and eNB measurement based DL beamforming have specific shortcomings.

For example, the PMI based beamforming is restricted by the wireless device's capability, since some wireless devices may not be able to report PMI for some advanced transmission modes. For example, some legacy LTE wireless devices, such as release 8 wireless devices, will fail to report PMI for a Release 13/14 based Massive MIMO 4.5G communications network. The reason for this is that in the Releases 13 or 14 the 3GPP defines some advanced CSI-RSs to be transmitted by the eNB and to be used by the wireless device to determine the PMI, but these advanced CSI-RSs are not visible e.g. understandable by the legacy wireless devices. By the expression legacy wireless devices when used herein is meant wireless devices of releases 8, 9, 10, 11, or 12.

A more challenging issue is that the PMI based beamforming normally requires a lot of DL reference signals, such as Channel Status Information-Reference Signals (CSI-RS), which gives the communications network a lot of overhead. Hence, the consequence of this drawback is getting serious when the number of eNB antennas increases, which is a feature for the 5G and the next-generation of wireless communications networks.

As another example, the eNB measurement based DL beamforming has the shortcoming that it can only work for the DL in exactly same way as in the UL while in the real world it is not always true or achievable. For example, in FDD-LTE, the UL and the DL are located in different frequency band. From a statistical point of view, the UL and the DL are totally independently distributed, and thus the UL and DL may not be the same.

An object addressed by embodiments herein is how to improve performance in a wireless communications system.

According to embodiments herein, it is provided a way of improving the performance in the wireless communications system.

In order to overcome the above-mentioned drawbacks, some embodiments disclosed herein provide ways to fully utilize eNB sector-specific data logs on downlink beamforming information and corresponding uplink channel information to minimize the DL resource cost for reference signals that otherwise would be transmitted.

For example, some embodiments disclosed herein employ a machine learning method to capture a relationship between the uplink channel information and downlink beamforming information ways to fully utilize eNB sector-specific data logs on downlink beamforming information and corresponding uplink channel information to minimize the DL resource cost for reference signals that otherwise would be transmitted. The uplink channel information may be CSI and the downlink beamforming information may be PMI.

This is especially advantageous for massive MIMO cases and/or during periods with a lot of downlink traffic. The learning is cell specific and the whole learning network is adaptive, e.g. different and variable, for different cells according to different training data. The training data may be historic data logs for different radio environments.

In this disclosure reference is sometimes made to a Multiple Layer Perceptron (MLP) neural network as an implementation example of the machine learning method. The MLP neural network is a class of feedforward artificial neural network. An MLP comprises at least three layers of nodes. Except for the input nodes, each node is a neuron that uses a nonlinear activation function. However, it should be understood that embodiments are not limited to such a neural network but it should be understood that it is only given as an example. Other examples of machine learning methods may be based on a Radial Basis Function (RBF) or a Support Vector Machine (SVM), etc.

Now, some embodiments will be briefly described in order to give a general understanding. A more detailed description will follow.

A neural network or another type of machine learner may be defined and setup to learn relationships between downlink beamforming information, e.g. PMI, and uplink channel information. The neural network may be trained by an individual network environment. Each radio network node, each radio sector, each responsible function unit of the radio network node, or a relevant serving RAN-cloud for each radio sector, may trigger a wireless device to report downlink beamforming information, e.g. PMI, and meanwhile measure uplink channel information simultaneously. Then the data collected by such reporting and measuring is stored for a later neural network training and/or a concurrent neural network training. The neural network training may be performed online or offline. Online training may be training during operation of a wireless communications system while offline training may be training performed before installation of a machine learning unit in the wireless communications system.

For example, a well-trained neural network based machine learning unit helps the radio network node to avoid frequent PMI reports from the wireless device and to reduce all corresponding DL RS overhead for PMI calculation, at least for DL traffic heavy period.

Procedure-wise, the data logs may be used for offline training the system in the factory, e.g. before deployment or installation. Then real-time data may be used for online training to update and refine the site-specific learning network to that particular site, e.g. radio sector.

FIG. 1 is a schematic block diagram schematically depicting an example of a wireless communications system 10 that is relevant for embodiments herein and in which embodiments herein may be implemented.

A wireless communications network 100 is comprised in the wireless communications system 10. The wireless communications network 100 may comprise a Radio Access Network (RAN) 101 part and a Core Network (CN) 102 part. The wireless communication network 100 is typically a telecommunication network, such as a cellular communication network that supports at least one Radio Access Technology (RAT), e.g. New Radio (NR) that also may be referred to as 5G.

The wireless communication network 100 comprises network nodes that are communicatively interconnected. The network nodes may be logical and/or physical and are located in one or more physical devices. The wireless communication network 100 comprises one or more network nodes, e.g. a radio network node 110, such as a first radio network node, and a second radio network node 111.

A radio network node is a network node typically comprised in a RAN, such as the RAN 101, and/or that is or comprises a radio transmitting network node, such as base station, and/or that is or comprises a controlling node that control one or more radio transmitting network nodes.

The wireless communication network 100, or specifically one or more network nodes thereof, e.g. the first radio network node 110 and the second radio network node 111, may be configured to serve and/or control and/or manage and/or communicate with one or more communication devices, such as a wireless device 120, using one or more beams, e.g. a downlink beam 115a and/or a downlink beam 115b and/or a downlink beam 116 provided by the wireless communication network 100, e.g. the first radio network node 110 and/or the second radio network node 111, for communication with said one or more communication devices. Said one or more communication devices may provide uplink beams, respectively, e.g. the wireless device 120 may provide an uplink beam 117 for communication with the wireless communication network 100.

Each beam may be associated with a particular Radio Access Technology (RAT). As should be recognized by the skilled person, a beam is associated with a more dynamic and relatively narrow and directional radio coverage compared to a conventional cell that is typically omnidirectional and/or provides more static radio coverage. A beam is typically formed and/or generated by beamforming and/or is dynamically adapted based on one or more recipients of the beam, such as one of more characteristics of the recipients, e.g. based on which direction a recipient is located. For example, the downlink beam 115a may be provided based on where the wireless device 120 is located and the uplink beam 117 may be provided based on where the first radio network node 110 is located.

Moreover, the wireless communication network 100 may comprise one or more central nodes, e.g. a central node 130 i.e. one or more network nodes that are common or central and communicatively connected to multiple other nodes, e.g. multiple radio network nodes, and may be for managing and/or controlling these nodes. The central nodes may e.g. be core network nodes, i.e. network nodes part of the CN 102.

The wireless communication network, e.g. the CN 102, may further be communicatively connected to, and thereby e.g. provide access for said communication devices, to an external network 200, e.g. the Internet. The wireless device 120 may thus communicate via the wireless communication network 100, with the external network 200, or rather with one or more other devices, e.g. servers and/or other communication devices connected to other wireless communication networks, and that are connected with access to the external network 200.

Moreover, there may be one or more external nodes, e.g. an external node 201, for communication with the wireless communication network 100 and node(s) thereof. The external node 201 may e.g. be an external management node. Such external node may be comprised in the external network 200 or may be separate from this.

Furthermore, the one or more external nodes may correspond to or be comprised in a so called computer, or computing, cloud, that also may be referred to as a cloud system of servers or computers, or simply be named a cloud, such as a computer cloud 202 as shown in the figure, for providing certain service(s) to outside the cloud via a communication interface. The exact configuration of nodes etc. comprised in the cloud in order to provide said service(s) may not be known outside the cloud. The name "cloud" is often explained as a metaphor relating to that the actual device(s) or network element(s) providing the services are typically invisible for a user of the provided service(s), such as if obscured by a cloud. The computer cloud 202, or typically rather one or more nodes thereof, may be communicatively connected to the wireless communication network 100, or certain nodes thereof, and may be providing one or more services that e.g. may provide, or facilitate, certain functions or functionality of the wireless communication network 100 and may e.g. be involved in performing one or more actions according to embodiments herein. The computer cloud 202 may be comprised in the external network 200 or may be separate from this.

Attention is drawn to that FIG. 1 is only schematic and for exemplifying purpose and that not everything shown in the figure may be required for all embodiments herein, as should be evident to the skilled person. Also, a wireless communication network or networks that in reality correspond(s) to the wireless communication network 100 will typically comprise several further network nodes, such as core network nodes, e.g. base stations, radio network nodes, further beams, and/or cells etc., as realized by the skilled person, but which are not shown herein for the sake of simplifying.

A machine learning unit 300 is comprised in the wireless communications system 10. Thus, it should be understood that the machine learning unit 300 may be comprised in the wireless communications network 100 or in the external network 200. For example, the machine learning unit 300 may be a separate unit operating within the wireless communications network 100 or the external network 200 or it may be comprised in a node operating within the wireless communications network 100 or the external network 200. In some embodiments, the machine learning unit 300 is comprised in the radio network node 110. Alternatively, the machine learning unit 300 may be comprised in the core network 102, such as e.g. in the central node 130, or it may be comprised in the external node 201 or in the computer cloud 202 of the external network 200.

Note that actions described in this disclosure may be taken in any suitable order and/or be carried out fully or partly overlapping in time when this is possible and suitable. Dotted lines attempt to illustrate features that are not present in all embodiments.

Any of the actions below may when suitable fully or partly involve and/or be initiated and/or be triggered by another, e.g. external, entity or entities, such as device and/or system, than what is indicated below to carry out the actions. Such initiation may e.g. be triggered by said another entity in response to a request from e.g. the device and/or the wireless communication network, and/or in response to some event resulting from program code executing in said another entity or entities. Said another entity or entities may correspond to or be comprised in a so called computer cloud, or simply cloud, and/or communication with said another entity or entities may be accomplished by means of one or more cloud services.

Figure 2:
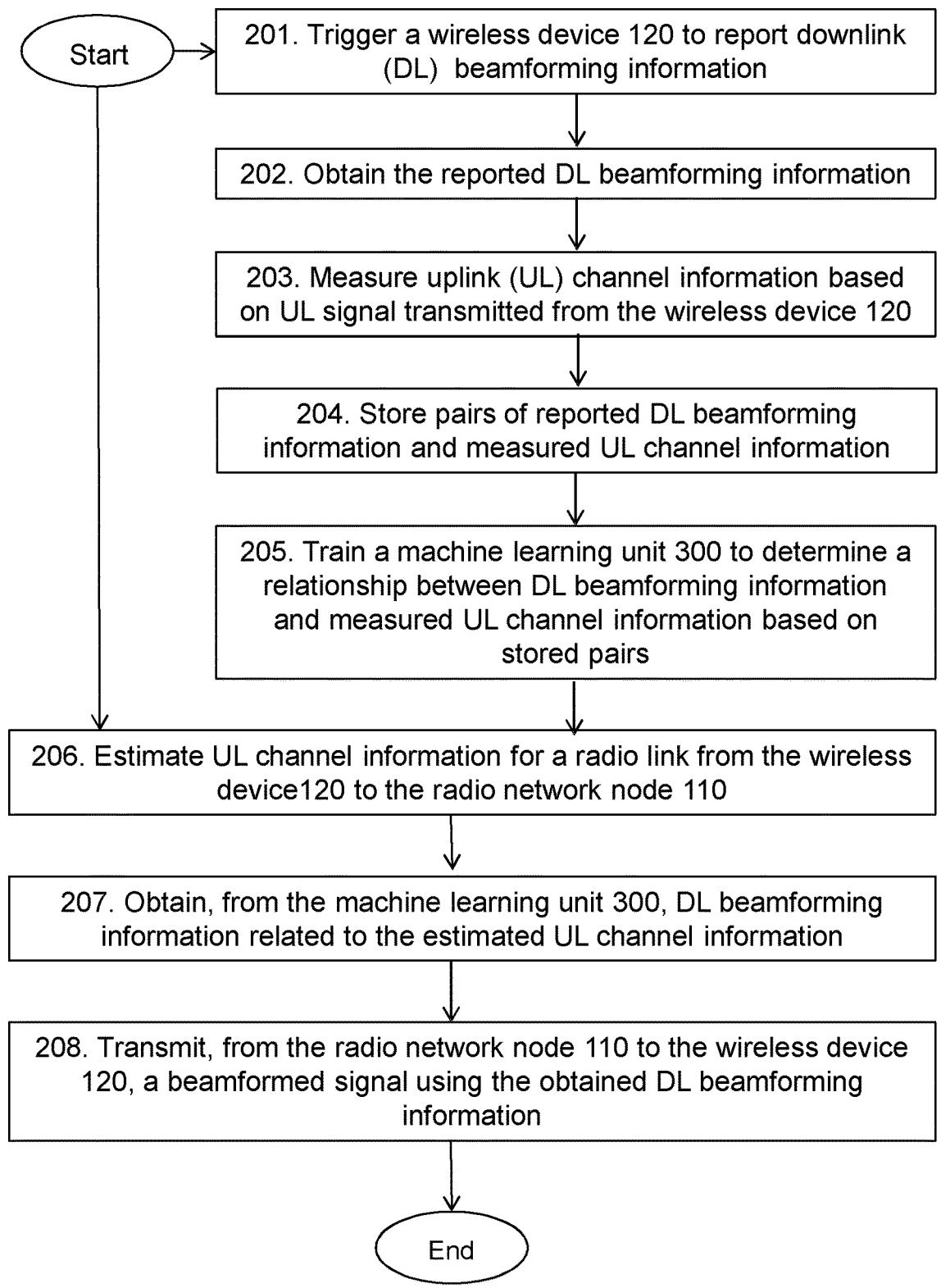
FIG. 2 is a flowchart depicting embodiments of a method performed by a wireless communications system.

Examples of a method performed by the wireless communications system 10 for transmission of a downlink signal in the wireless communications network 100 supporting beamforming will now be described with reference to flowchart depicted in FIG. 2. As mentioned above, the radio network node 110 and the wireless device 120 operate in the wireless communications network 100.

The method comprises one or more of the following actions. It should be understood that these actions may be taken in any suitable order and that some actions may be combined.

Action 201

In some embodiments, the wireless communications system 10, e.g. by means of the radio network node 110, triggers the wireless device 120 to report downlink beamforming information used in transmission of one or more downlink signals transmitted by the radio network node 110 and received by the wireless device 120. For example, this may be the case when the system 10 wants to collect data that may be used in training of the machine learning unit 300.

Action 202

In some embodiments, when the wireless communications system 10 has triggered the wireless device 120 to report downlink beamforming information the system 10 should also receive the reported information. In such embodiments, the wireless communication system 10, e.g. by means of the radio network node 110, obtains the reported downlink beamforming information from the wireless device 120.

Action 203

In some embodiments, the wireless communications system 10, e.g. by means of the radio network node 110, measures uplink channel information based on one or more uplink signals transmitted using a radio link from the wireless device 120 to the radio network node 110.

The wireless communications system 10 may perform the measuring of the uplink channel information simultaneously with the triggering described in Action 201 above, but it does not have to be simultaneously.

However, the duration between the triggering and the measuring should preferably be small to have a good correlation between the reported downlink beamforming information and the measured uplink channel information. By the expression small duration when used here is meant that the period of time between the triggering and the measuring should be within the channel coherence time, e.g. within 10 ms just to give an example. In other words and in some embodiments, the wireless communications system performs the triggering of Action 201 and the measuring of Action 203 during a selected period of time.

Action 204

In some embodiments, the wireless communications system 10 stores pairs of reported downlink beamforming information and measured uplink channel information, wherein each pair comprises reported downlink beamforming information and corresponding measured uplink channel information for the radio link.

For example, this may be done in order to use the stored pairs of downlink beamforming information and measured uplink channel information during e.g. training of the machine learning unit 300 at a later point in time (cf. Action 205 below) or during retrieval of downlink beamforming information based on estimated uplink channel information (cf. Actions 206 and 207 below). The wireless communications system 10 may store the information in a memory comprised in or communicatively connected to the wireless communications system 10.

Action 205

In some embodiments, the wireless communications system 10 trains the machine learning unit 300 to determine the relationships between beamforming information and uplink channel information based on stored pairs of reported downlink beamforming information and measured uplink channel information by performing a neural network method on the stored pairs of reported downlink beamforming information and measured uplink channel information.

The neural network method may be performed using a neural network comprised in the machine learning unit 300. The neural network may be specific for the radio cell sector or a plurality of radio cell sectors and it may comprise: an input layer, an output layer and possibly one or more hidden layers. Each layer may comprise one or more artificial neurons linked to one or more other artificial neurons of the same layer or of another layer. Further, the one or more artificial neurons may each have an activation function, an input weighting coefficient, a bias, and an output weighting coefficient. Further, the weighting coefficients and the bias may be changeable, e.g. variable, during training of the neural network.

The wireless communications system 10 may perform the training of the machine learning unit 300 by performing the neural network method comprising:

providing known uplink channel information and known downlink beamforming information to the neural network, wherein the known uplink channel information and the known downlink beamforming information are comprised in a known pair of beamforming information and uplink channel information; and adjusting weighting coefficients and biases for one or more of the artificial neurons until the known downlink beamforming information is given as an output from the neural network when the uplink channel information is given as an input to the neural network.

Alternatively and in some embodiments, the wireless communications system 10 performs the training of the machine learning unit 300 by performing the neural network method comprising:

training the machine learning unit 300 by executing a back propagation algorithm or a genetic algorithm on stored pairs of reported downlink beamforming information and measured uplink channel information to calculate weighting coefficients and biases for one or more of the artificial neurons.

As previously mentioned, the training may be performed offline or online.

For example, a vendor may pre-train the beamforming neural network based on typical channel models by performing simulations or channel measurements. The typical channel is normally slightly different from the actual on-site channel environment. So, weights may not be well-tuned, but almost. This pre-training may be used for providing initial, e.g. default, settings of the neural network.

Additionally or alternatively, the communications system 10, e.g. the radio network node 110, may download neural network weights from an external network, such as the external network 200, or from a network node within the wireless communications network 100, e.g. the core network node 102 This may be performed based on an initial training result, and may also be used for providing initial, e.g. default, settings of the neural network.

Further, training of the machine learning unit 300 may also be based on individual on-site network data. This may be done by triggering the wireless device 120 to report downlink beamforming information and by measuring uplink channel information as described above.

Action 206

The wireless communications system 10 estimates, e.g. in the radio network node 110, uplink channel information for the radio link from the wireless device 120 to the radio network node 110, wherein the wireless device 120 is operating within a radio cell sector comprised in the wireless communications network 100. This is done in order to have estimated uplink channel information for which downlink beamforming information should be obtained, cf. Action 207 below.

The estimated uplink channel information may be uplink channel information on a carrier frequency $f_0$ for the radio link.

As previously mentioned, the uplink channel information may be CSI, and the estimation of the uplink channel information may be based on a received CSI-RS.

Action 207

The wireless communications system 10 obtains downlink beamforming information related to the estimated uplink channel information from the machine learning unit 300 comprising relationships between beamforming information and uplink channel information determined based on stored pairs of reported downlink beamforming information and measured uplink channel information. The obtained downlink beamforming information is applicable for the radio cell sector. This is done in order for the wireless communications system 10, e.g. the radio network node 110, to know which downlink beamforming information to use in transmissions to the wireless device 120 operating in the radio cell sector.

The obtained output downlink beamforming information may be beamforming information on a target frequency $f_1$ for the radio link. The target frequency $f_1$ may be the same as or different from the carrier frequency $f_0$ for the radio link.

As previously mentioned, the downlink beamforming information may be PMI. Further, as also previously mentioned, the machine learning unit 300 may be comprised in the radio network node 110, in the core network 102 such as in the core network node 130 or in the external network 200, such as in the external node 201 or in the computer cloud 202.

Action 208

Now the wireless communications system 10 may use the obtained downlink beamforming information for transmissions. Thus, the wireless communications system 10 transmits, from the radio network node 110 towards the wireless device 120, a beamformed downlink signal using the obtained downlink beamforming information.

Figure 3:
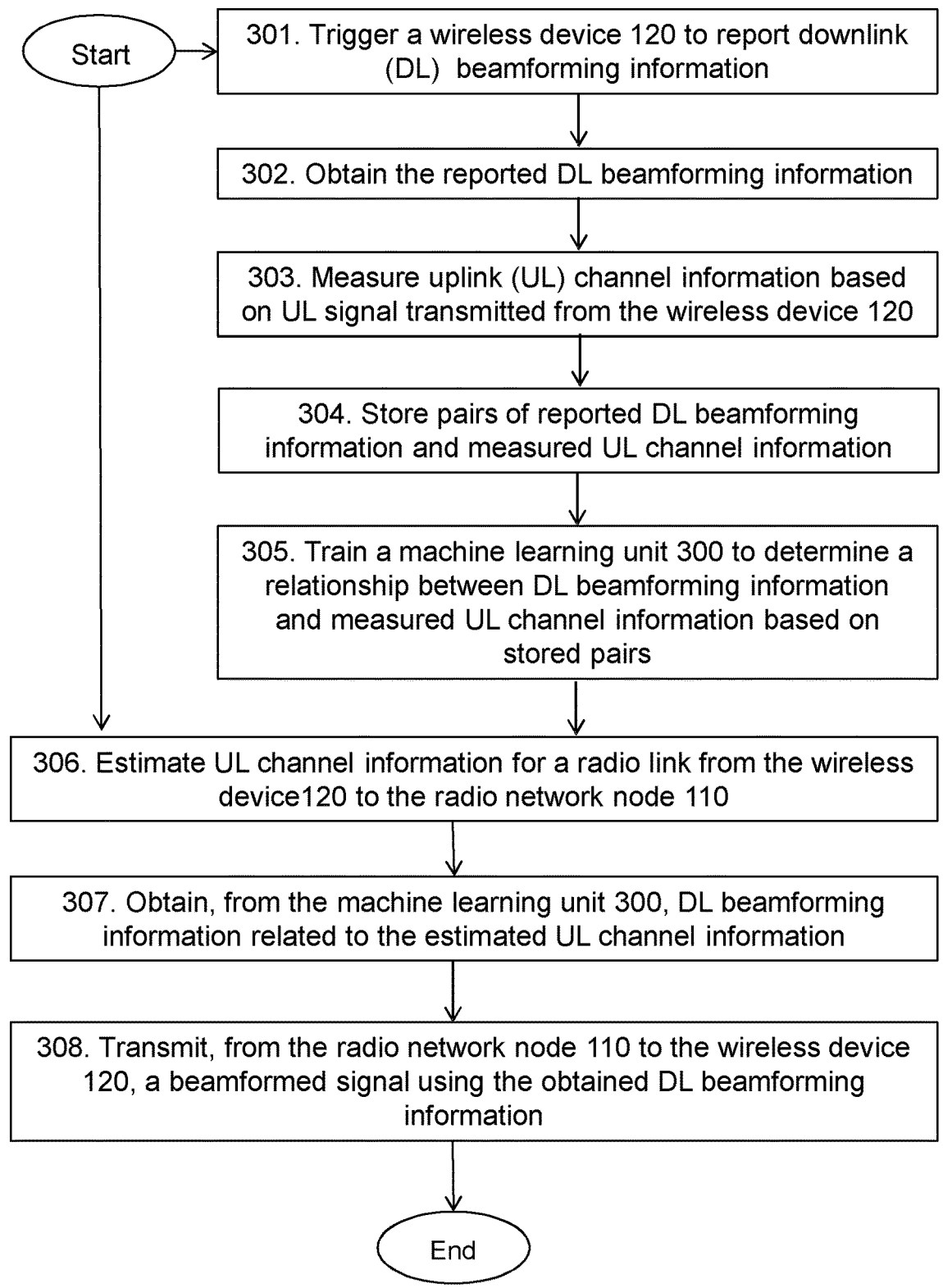
FIG. 3 is a flowchart depicting embodiments of a method performed by a radio network node.

Examples of a method performed by the radio network node 120 for transmission of a downlink signal in the wireless communications network 100 supporting beamforming will now be described with reference to flowchart depicted in FIG. 3. As mentioned above, the radio network node 110 and the wireless device 120 operate in the wireless communications network 100.

The method comprises one or more of the following actions. It should be understood that these actions may be taken in any suitable order and that some actions may be combined.

Action 301

In some embodiments, the radio network node 110 triggers the wireless device 120 to report downlink beamforming information used in transmission of one or more downlink signals transmitted by the radio network node 110 and received by the wireless device 120. For example, this may be the case when radio network node 110 wants to collect data from one or more wireless devices, e.g. the wireless device 120, which may be used in training of the machine learning unit 300.

The radio network node 110 may trigger the wireless device 120 to report the downlink beamforming information during a low traffic period, or idle time period. Further, the radio network node 110 may trigger a selected group of wireless devices to report downlink beamforming information and measure uplink channel information from the selected group of wireless devices. In short, it is relative flexible for the radio network node 110 select proper time period and/or a group of wireless devices to get these neural network training set.

Action 302

In some embodiments, when the radio network node 120 has triggered the wireless device 120 to report downlink beamforming information the radio network node 120 should also receive the reported information. In such embodiments, the radio network node 110 obtains, e.g. receives, the reported downlink beamforming information from the wireless device 120.

Action 303

In some embodiments, the radio network node 110 measures uplink channel information based on one or more uplink signals transmitted using a radio link from the wireless device 120 to the radio network node 110.

The radio network node 120 may perform the measuring of the uplink channel information simultaneously with the triggering described in Action 301 above, but it does not have to be simultaneously.

As previously mentioned, the duration between the triggering and the measuring should be small to have correlation between the reported downlink beamforming information and the measured uplink channel information. By the expression small duration when used here is meant that the period of time between the triggering and the measuring should be within the channel coherence time, e.g. within 10 ms. In other words and in some embodiments, the radio network node 120 performs the triggering of Action 301 and the measuring of Action 303 during a selected period of time.

Action 304

In some embodiments, the radio network node 120 stores pairs of reported downlink beamforming information and measured uplink channel information, wherein each pair comprises reported downlink beamforming information and corresponding measured uplink channel information for the radio link.

A pair of reported downlink beamforming information and measured uplink channel information is considered as the downlink beamforming information reported and the uplink channel information measured within the selected period of time, e.g. within the channel coherence time.

The radio network node 120 may store the information in a memory comprised in or communicatively connected to the radio network node 120.

The collected data, e.g. the pairs of reported downlink beamforming information and measured uplink channel information, may be stored for each radio beam sector for a relatively long time such as for days, weeks, or months for a latter machine learning process to capture the relationship of uplink channel information and downlink beamforming information for each specific site.

Action 305

In some embodiments, e.g. when a machine learning unit 300 is comprised in the radio network node 120, the radio network node 120 trains the machine learning unit 300 to determine the relationships between downlink beamforming information and uplink channel information based on stored pairs of reported downlink beamforming information and measured uplink channel information by performing a neural network method on the stored pairs of reported downlink beamforming information and measured uplink channel information.

The neural network method may be performed using a neural network comprised in the machine learning unit 300. The neural network may be specific for the radio cell sector or a plurality of radio cell sectors and it may comprise: an input layer, an output layer and possibly one or more hidden layers. Each layer may comprise one or more artificial neurons linked to one or more other artificial neurons of the same layer or of another layer. Further, the one or more artificial neurons may each have an activation function, an input weighting coefficient, a bias, and an output weighting coefficient. Further, the weighting coefficients and the bias may be changeable, e.g. variable, during training of the neural network.

The radio network node 120 may perform the training of the machine learning unit 300 by performing the neural network method comprising:

providing known uplink channel information and known downlink beamforming information to the neural network, wherein the known uplink channel information and the known downlink beamforming information are comprised in a known pair of beamforming information and uplink channel information; and adjusting weighting coefficients and biases for one or more of the artificial neurons until the known downlink beamforming information is given as an output from the neural network when the uplink channel information is given as an input to the neural network.

Alternatively and in some embodiments, the radio network node 120 performs the training of the machine learning unit 300 by performing the neural network method comprising:

training the machine learning unit 300 by executing a back propagation algorithm or a genetic algorithm on stored pairs of reported downlink beamforming information and measured uplink channel information to calculate weighting coefficients and biases for one or more of the artificial neurons.

Action 306

The radio network node 120 estimates uplink channel information for the radio link from the wireless device 120 to the radio network node 110, wherein the wireless device 120 is operating within a radio cell sector comprised in the wireless communications network 100.

The estimated uplink channel information may be uplink channel information on a carrier frequency $f_0$ for the radio link.

As previously mentioned, the uplink channel information may be CSI, and the estimation of the uplink channel information may be based on a received CSI-RS.

Action 307 In order to obtain downlink beamforming information without unnecessary signalling, the radio network node 120 obtains downlink beamforming information related to the estimated uplink channel information from the machine learning unit 300. The machine learning unit 300 comprises relationships between beamforming information and uplink channel information determined based on stored pairs of reported downlink beamforming information and measured uplink channel information. The obtained downlink beamforming information is applicable for the radio cell sector.

The obtained output downlink beamforming information may be beamforming information on a target frequency $f_1$ for the radio link. The target frequency $f_1$ may be the same as or different from the carrier frequency $f_0$ for the radio link.

Action 308

The radio network node 120 transmits, towards the wireless device 120, a beamformed downlink signal using the obtained downlink beamforming information.

Figure 4:
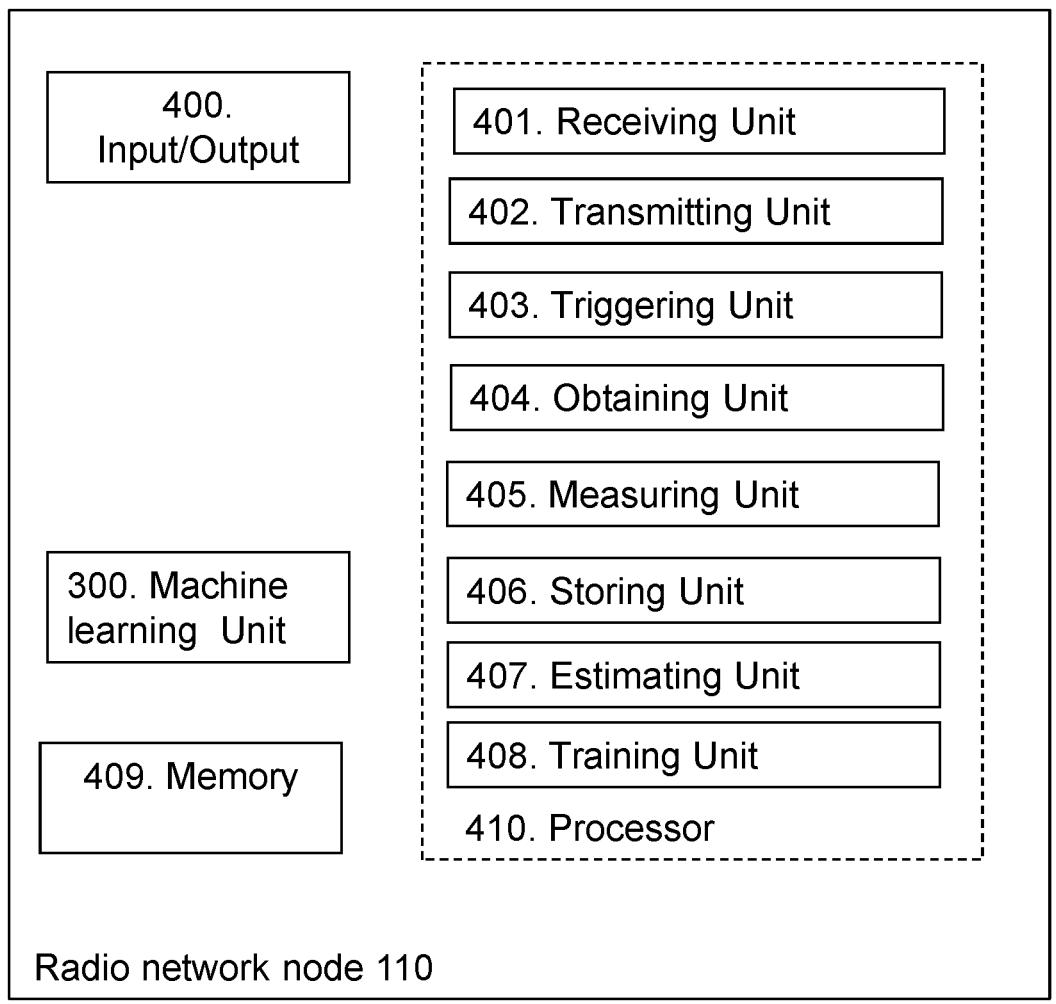
FIG. 4 is a schematic block diagram illustrating embodiments of a radio network node.

To perform the method for transmission of a downlink signal in the wireless communications network 100 configured to support beamforming, the radio network node 110 may be configured according to an arrangement depicted in FIG. 4. As previously described, the radio network node 110 and the wireless device 120 are configured to operate in the wireless communications network 100.

In some embodiments, the radio network node 110 comprises an input and/or output interface 400 configured to communicate with one or more wireless devices, and/or one or more network nodes, e.g. the first and second radio network nodes 110,111. The input and/or output interface 400 may comprise a wireless receiver (not shown) and a wireless transmitter (not shown).

The radio network node 110 is configured to receive, by means of a receiving unit 401 configured to receive, a transmission, e.g. a data packet, a signal or information, from one or more network nodes, and/or from one or more other wireless devices, e.g. the wireless device 120. The receiving unit 401 may be implemented by or arranged in communication with a processor 410 of the radio network node 110. The processor 410 will be described in more detail below.

The radio network node 110 is configured to transmit, by means of a transmitting unit 402 configured to transmit, a transmission, e.g. a data packet, a signal or information, to one or more network nodes or one or more other wireless devices, e.g. the wireless device 120. The transmitting unit 402 may be implemented by or arranged in communication with the processor 410 of the radio network node 110.

The radio network node 110 is configured to transmit, towards the wireless device 120, a beamformed downlink signal using an obtained downlink beamforming information.

The radio network node 110 may be configured to trigger, by means of a triggering unit 403 configured to trigger, the wireless device 120 to report downlink beamforming information. The triggering unit 403 may be implemented by or arranged in communication with the processor 410 of the radio network node 110.

Thus, the radio network node 110 may be configured to trigger the wireless device 120 to report downlink beamforming information used in transmission of one or more downlink signals transmitted by the radio network node 110 and received by the wireless device 120.

As previously mentioned, the radio network node 110 may be configured to trigger the wireless device 120 to report downlink beamforming information during a selected period of time.

The radio network node 110 is configured to obtain, by means of an obtaining unit 404 configured to obtain, downlink beamforming information. The obtaining module 404 may be implemented by or arranged in communication with the processor 410 of the radio network node 110.

In some embodiments, for example when the wireless device 120 is triggered to report received downlink beamforming information, the radio network node 110 is configured to obtain, e.g. receive, the reported downlink beamforming information from the wireless device 120. As previously, this may be the case when the radio network node 120 wants to collect information that may be used in training of the machine learning unit 300.

In order to obtain downlink beamforming information without unnecessary signalling, the radio network node 110 is configured to obtain downlink beamforming information related to estimated uplink channel information from the machine learning unit 300. The machine learning unit 300 comprises relationships between beamforming information and uplink channel information determined based on stored pairs of reported downlink beamforming information and measured uplink channel information, wherein the downlink beamforming information is applicable for a radio cell sector. The wireless device 120 is operating within the radio cell sector comprised in the wireless communications network 100.

As previously mentioned, the obtained output downlink beamforming information may be beamforming information on a target frequency $f_1$ for the radio link.

The radio network node 110 may be configured to measure, by means of a measuring unit 405 configured to measure, uplink channel information. The measuring module 405 may be implemented by or arranged in communication with the processor 410 of the radio network node 110.

In order to collect data that may be used in training of the machine learning unit 300, the radio network node 110 may measure uplink channel information based on one or more uplink signals transmitted using the radio link from the wireless device 120 to the radio network node 110.

As previously mentioned, the radio network node 110 may be configured to measure uplink channel information during the selected period of time.

The radio network node 110 may be configured to store, by means of a storing unit 406 configured to store, data or information in a memory. The storing module 406 may be implemented by or arranged in communication with the processor 410 of the radio network node 110.

In some embodiments, the radio network node 110 is configured to store pairs of the reported downlink beamforming information and the measured uplink channel information, wherein each pair comprises reported downlink beamforming information and corresponding measured uplink channel information for the radio link.

As previously mentioned, a pair of reported downlink beamforming information and measured uplink channel information is considered as the downlink beamforming information reported and the uplink channel information measured within the selected period of time, e.g. within the channel coherence time.

The information may be stored in a memory of the radio network node such as a memory 409, and/or in a memory communicatively connected to the radio network node 110. As will be described below, the stored information may be used in training of the machine learning unit 300.

The radio network node 110 is configured to estimate, by means of an estimating unit 407 configured to estimate, uplink channel information. The estimating module 407 may be implemented by or arranged in communication with the processor 410 of the radio network node 110.

The radio network node 110 is configured to estimate, uplink channel information for a radio link from the wireless device 120 to the radio network node 110. The wireless device 120 is operating within a radio cell sector comprised in the wireless communications network 100.

As previously mentioned, the estimated uplink channel information may be uplink channel information on a carrier frequency $f_0$ for the radio link.

In some embodiments, the radio network node 110 comprises the machine learning unit 300. In such embodiments, the radio network node 110 is configured to train, by means of a training unit 408 configured to train, the machine learning unit 300. The training module 408 may be implemented by or arranged in communication with the processor 410 of the radio network node 110.

In such embodiments, the radio network node 110 may be configured to train the machine learning unit 300 to determine the relationships between downlink beamforming information and uplink channel information based on stored pairs of reported downlink beamforming information and measured uplink channel information by performing a neural network method on the stored pairs of reported downlink beamforming information and measured uplink channel information.

As previously mentioned, the neural network may be specific for the radio cell sector or a plurality of radio cell sectors and it may comprise: an input layer, an output layer and possibly one or more hidden layers. Each layer may comprise one or more artificial neurons linked to one or more other artificial neurons of the same layer or of another layer. Further, the one or more artificial neurons may each have an activation function, an input weighting coefficient, a bias, and an output weighting coefficient. Furthermore, the weighting coefficients and the bias may be changeable, e.g. variable, during training of the neural network.

The radio network node 110 may be configured to train the machine learning unit 300 by performing the neural network method by further being configured to:
provide known uplink channel information and known downlink beamforming information to the neural network, wherein the known uplink channel information and the known downlink beamforming information are comprised in a known pair of downlink beamforming information and uplink channel information; and
adjust weighting coefficients and biases for one or more of the artificial neurons until the known downlink beamforming information is given as an output from the neural network when the uplink channel information is given as an input to the neural network.

Alternatively and in some embodiments, the radio network node 110 may be configured to train the machine learning unit 300 by performing the neural network method by further being configured to train the machine learning unit 300 by executing a back propagation algorithm or a genetic algorithm on stored pairs of reported downlink beamforming information and measured uplink channel information to calculate weighting coefficients and biases for one or more of the artificial neurons.

The radio network node 110 may also comprise means for storing data. In some embodiments, the radio network node 110 comprises a memory 409 configured to store the data. The data may be processed or non-processed data and/or information relating thereto. The memory 409 may comprise one or more memory units. Further, the memory 409 may be a computer data storage or a semiconductor memory such as a computer memory, a read-only memory, a volatile memory or a non-volatile memory. The memory is arranged to be used to store obtained information, data, configurations, and applications etc. to perform the methods herein when being executed in the radio network node 110.

Embodiments herein for transmission of a downlink signal in the wireless communications network 100 supporting beamforming may be implemented through one or more processors, such as the processor 410 in the arrangement depicted in FIG. 4, together with computer program code for performing the functions and/or method actions of embodiments herein. The program code mentioned above may also be provided as a computer program product, for instance in the form of a data carrier carrying computer program code for performing the embodiments herein when being loaded into the radio network node 110. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the radio network node 110.

Those skilled in the art will also appreciate that the input/output interface 400, the receiving unit 401, the transmitting unit 402, the triggering unit 403, the obtaining unit 404, the measuring unit 405, the storing unit 406, the estimating unit 407, the training unit 408, one or more possible other units above may refer to a combination of analogue and digital circuits, and/or one or more processors configured with software and/or firmware, e.g. stored in the memory 409, that when executed by the one or more processors such as the processors in the radio network node 110 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Figure 5:
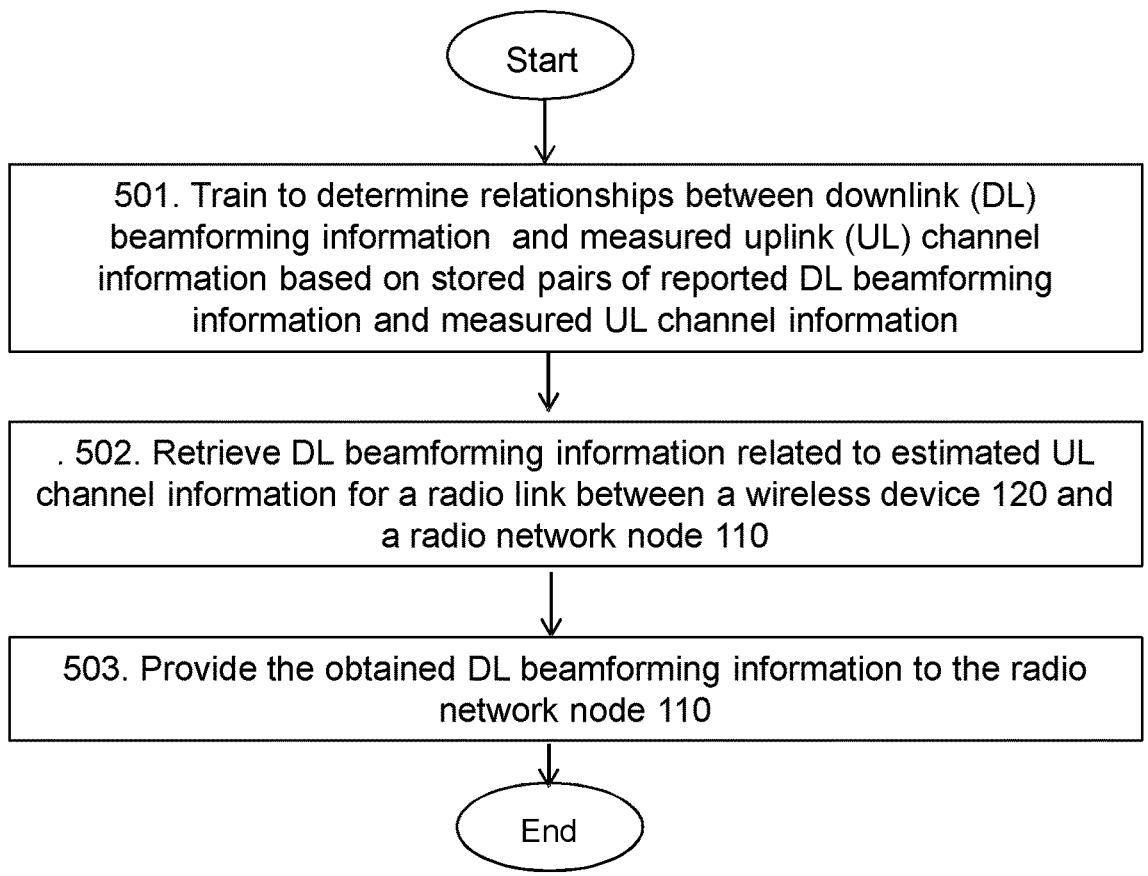
FIG. 5 is a flowchart depicting embodiments of a method performed by a machine learning unit.

Examples of a method performed by the machine learning unit 300 for supporting transmission of a downlink signal in the wireless communications network 100 supporting beamforming will now be described with reference to flowchart depicted in FIG. 5. As mentioned above, the radio network node 110 and the wireless device 120 operate in the wireless communications network 100.

The method comprises one or more of the following actions. It should be understood that these actions may be taken in any suitable order and that some actions may be combined.

Action 501

In order to support transmission of a downlink signal in the wireless communications network 100, the machine learning unit 300 trains to determine relationships between downlink beamforming information and uplink channel information based on stored pairs of reported downlink beamforming information and measured uplink channel information by performing a neural network method on stored pairs of reported downlink beamforming information and measured uplink channel information.

In some embodiments, the neural network method is performed using a neural network comprised in the machine learning unit 300. The neural network may be specific for the radio cell sector or a plurality of radio cell sectors and comprises: an input layer, an output layer and possibly one or more hidden layers. Each layer may comprise one or more artificial neurons linked to one or more other artificial neurons of the same layer or of another layer. Further, the one or more artificial neurons may each have an activation function, an input weighting coefficient, a bias, and an output weighting coefficient, wherein the weighting coefficients and/or the bias are changeable, e.g. variable, during training of the neural network.

The machine learning unit 300 may perform the training by performing the neural network method comprising:
providing known uplink channel information and known downlink beamforming information to the neural network, wherein the known uplink channel information and the known downlink beamforming information are comprised in a known pair of downlink beamforming information and uplink channel information; and adjusting weighting coefficients and biases for one or more of the artificial neurons until the known downlink beamforming information is given as an output from the neural network when the uplink channel information is given as an input to the neural network.

Alternatively and in some embodiments, the machine learning unit 300 may perform the training by executing a back propagation algorithm or a genetic algorithm on stored pairs of reported downlink beamforming information and measured uplink channel information to calculate weighting coefficients and biases for one or more of the artificial neurons.

Action 502

The machine learning unit 300 retrieves downlink beamforming information related to received estimated uplink channel information for a radio link between the wireless device 120 and the radio network node 110. The downlink beamforming information is retrieved based on the determined relationships and wherein the downlink beamforming information is applicable for a radio cell sector comprised in the wireless communications network 100. The machine learning unit 300 may retrieve the downlink beamforming information from a memory, e.g. a memory comprised in or communicatively connected to the wireless communications system 10 or a memory comprised in or communicatively connected the machine learning unit 30

As previously mentioned, the estimated uplink channel information may be uplink channel information on a carrier frequency $f_0$ for the radio link, and the obtained output downlink beamforming information may be beamforming information on a target frequency $f_1$ for the radio link. The target frequency $f_1$ may be the same as or different from the carrier frequency $f_0$ for the radio link.

Action 503

The machine learning unit 300 provides the obtained downlink beamforming information to the radio network node 110. In other words, the machine learning unit 300 may transmit or convey the obtained downlink beamforming information to the radio network node 110. Thereby, the machine learning unit 300 supports the radio network node 110 to transmit, towards the wireless device 120 operating within the radio cell sector, a beamformed downlink signal using the downlink beamforming information.

Figure 6:
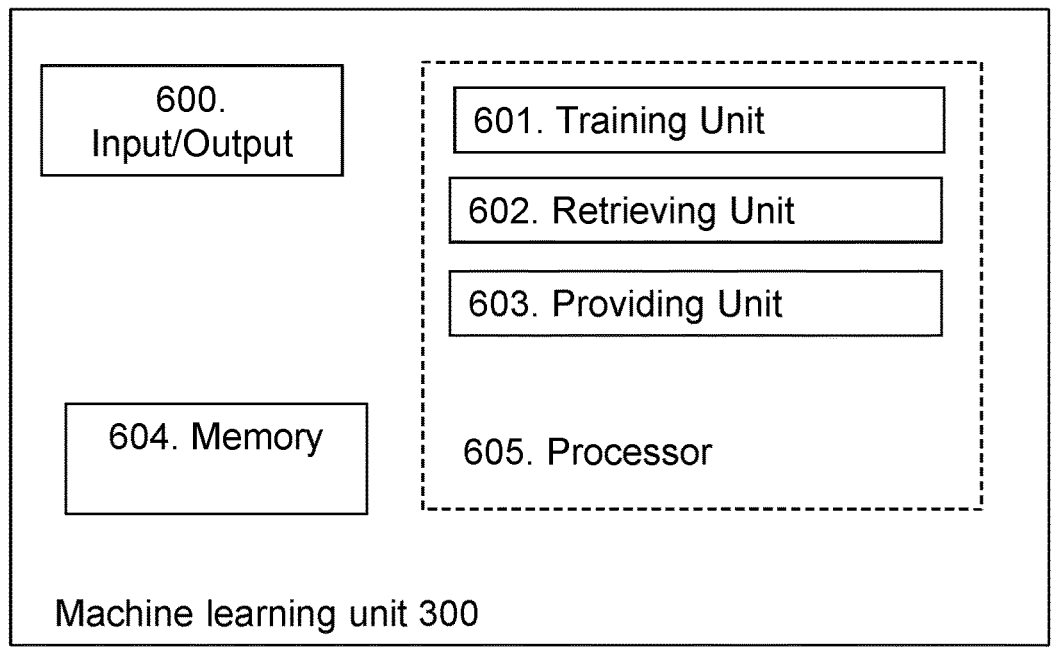
FIG. 6 is a schematic block diagram illustrating embodiments of a machine learning unit.

To perform the method for supporting transmission of a downlink signal in the wireless communications network 100 configured to support beamforming, the machine learning unit 300 may be configured according to an arrangement depicted in FIG. 6. As previously described, the radio network node 110 and the wireless device 120 are configured to operate in the wireless communications network 100.

In some embodiments, the machine learning unit 300 comprises an input and/or output interface 600 configured to communicate with one or more wireless devices, and/or one or more network nodes, e.g. the first and second radio network nodes 110,111. The input and/or output interface 600 may comprise a wireless receiver (not shown) and a wireless transmitter (not shown).

The machine learning unit 300 is configured to train, by means of a training unit 601 configured to train, to determine relationships between downlink beamforming information and uplink channel information. The training unit 601 may be implemented by or arranged in communication with a processor 605 of the machine learning unit 300. The processor 605 will be described in more detail below.

The machine learning unit 300 is configured to train to determine the relationships between downlink beamforming information and uplink channel information based on stored pairs of reported downlink beamforming information and measured uplink channel information by performing a neural network method on the stored pairs of reported downlink beamforming information and measured uplink channel information.

As previously mentioned, the neural network may be specific for the radio cell sector or a plurality of radio cell sectors and it may comprise: an input layer, an output layer and possibly one or more hidden layers. Each layer may comprise one or more artificial neurons linked to one or more other artificial neurons of the same layer or of another layer. Further, the one or more artificial neurons may each have an activation function, an input weighting coefficient, a bias, and an output weighting coefficient. Furthermore, the weighting coefficients and the bias may be changeable, e.g. variable, during training of the neural network.

The machine learning unit 300 may be configured to train by performing the neural network method by further being configured to:

provide known uplink channel information and known downlink beamforming information to the neural network, wherein the known uplink channel information and the known downlink beamforming information are comprised in a known pair of downlink beamforming information and uplink channel information; and adjust weighting coefficients and biases for one or more of the artificial neurons until the known downlink beamforming information is given as an output from the neural network when the uplink channel information is given as an input to the neural network.

Alternatively and in some embodiments, the machine learning unit 300 may train by performing the neural network method by further being configured to execute a back propagation algorithm or a genetic algorithm on stored pairs of reported downlink beamforming information and measured uplink channel information to calculate weighting coefficients and biases for one or more of the artificial neurons.

The machine learning unit 300 is configured to retrieve, by means of a retrieving unit 602 configured to retrieve, downlink beam forming information. The retrieving unit 602 may be implemented by or arranged in communication with the processor 605 of the machine learning unit 300.

The machine learning unit 300 is configured to retrieve downlink beamforming information related to received estimated uplink channel information for a radio link between the wireless device 120 and the radio network node 110. The downlink beamforming information is retrieved based on the determined relationships and the downlink beamforming information is applicable for a radio cell sector comprised in the wireless communications network 100.

The machine learning unit 300 may receive the estimated uplink channel information from the radio network node 110.

As previously mentioned, the estimated uplink channel information may be uplink channel information on a carrier frequency $f_0$ for the radio link, and the obtained output downlink beamforming information may be beamforming information on a target frequency $f_1$ for the radio link.

The machine learning unit 300 is configured to provide, by means of a providing unit 603 configured to provide, retrieved downlink beamforming information. The providing unit 603 may be implemented by or arranged in communication with the processor 604 of the machine learning unit 300.

The machine learning unit 300 is configured to provide the retrieved downlink beamforming information to the radio network node 110. Thereby supporting the radio network node 110 to transmit, towards the wireless device 120 operating within the radio cell sector, a beamformed downlink signal using the retrieved downlink beamforming information.

The machine learning unit 300 may also comprise means for storing data. In some embodiments, the machine learning unit 300 comprises a memory 604 configured to store the data. The data may be processed or non-processed data and/or information relating thereto. The memory 604b may comprise one or more memory units. Further, the memory 604 may be a computer data storage or a semiconductor memory such as a computer memory, a read-only memory, a volatile memory or a non-volatile memory. The memory is arranged to be used to store obtained information, data, configurations, and applications etc. to perform the methods herein when being executed in the machine learning unit 300.

Embodiments herein for supporting transmission of a downlink signal in the wireless communications network 100 supporting beamforming may be implemented through one or more processors, such as the processor 605 in the arrangement depicted in FIG. 6, together with computer program code for performing the functions and/or method actions of embodiments herein. The program code mentioned above may also be provided as a computer program product, for instance in the form of a data carrier carrying computer program code for performing the embodiments herein when being loaded into the machine learning unit 300. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the machine learning unit 300.

Those skilled in the art will also appreciate that the input/output interface 600, the training unit 601, the retrieving unit 602, the providing unit 603, one or more possible other units above may refer to a combination of analogue and digital circuits, and/or one or more processors configured with software and/or firmware, e.g. stored in the memory 604, that when executed by the one or more processors such as the processors in the machine learning unit 300 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Figure 7:
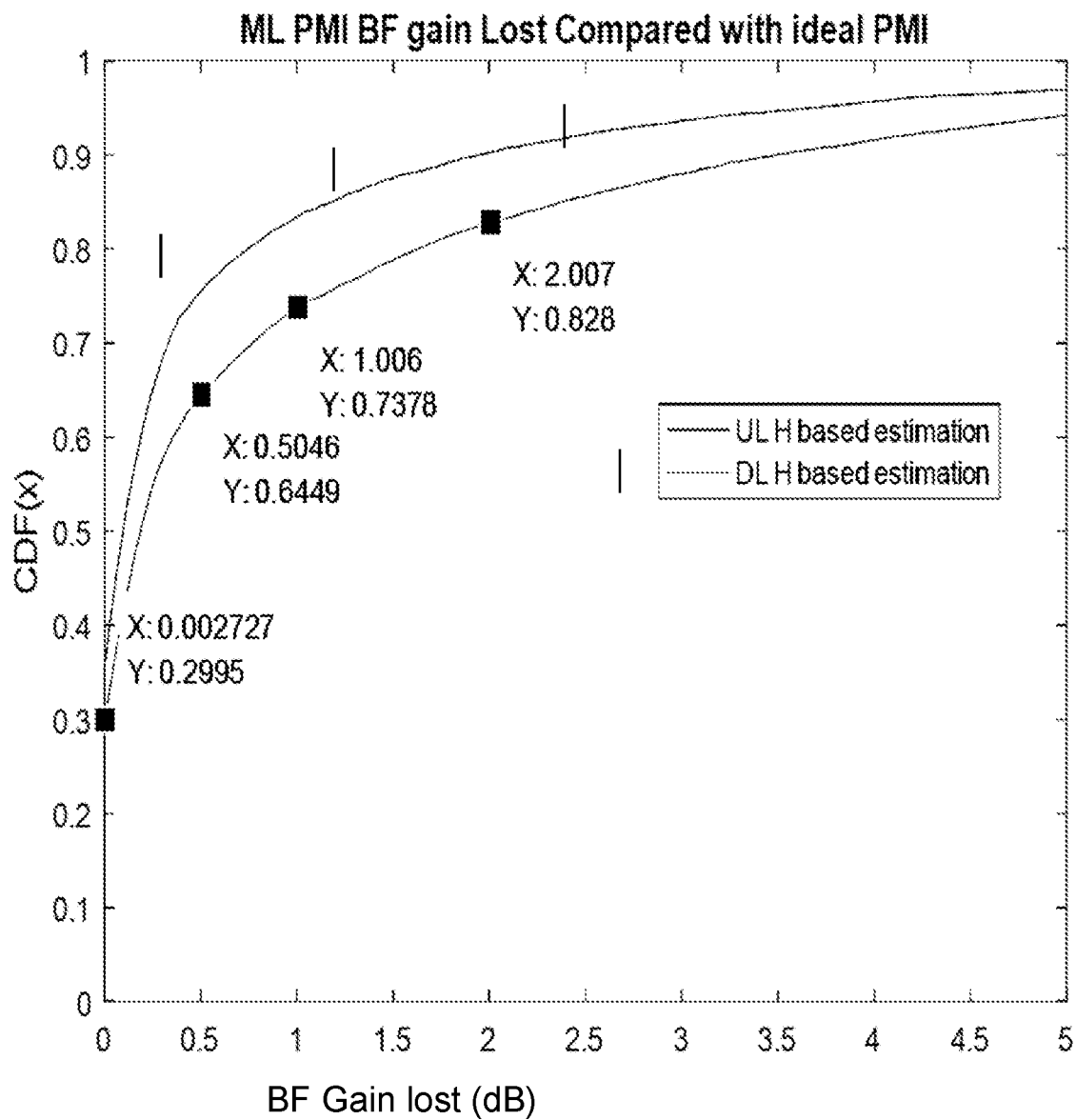
FIG. 7 schematically illustrates the machine learned PMI beamforming gain lost compared with the ideal PMI.

In order to verify the effectiveness of some embodiments, initial simulations have been carried out. FIG. 7 schematically illustrates the machine learned PMI beamforming gain lost compared with the ideal PMI. FIG. 7 schematically illustrates performance evaluations on embodiments of a machine learning based method with two different inputs: UL channel information and DL channel information. The curves indicate that for cases with UL channel as inputs, there is a 3 dB beamforming gain loss as compared to idea case for 90 percent of cases and 1 dB loss for 73 percentage of cases.

In other words, with zero DL reference signal resource for beamforming purpose (after getting a sufficient data logs), the system still works for most cases with an acceptable performance by using embodiments of the machine learning based method measuring UL reference signals. The performance may be further improved with enhancement of some embodiments disclosed herein.

In some embodiments, the present PMI signaling as standardized may be used and the performance improvements comes from processing in the radio network node 110, e.g. the eNB or gNB. This may be utilized as a proprietary performance improvement. However, if other signaling mechanisms are implemented to further improve the performance, then this may be relevant for later releases of NR regarding its implementation as one part of C-RAN or cloud RAN for DL reference resource reduction for a 'lean-carrier'.

Further Extensions and Variations

Figure 8:
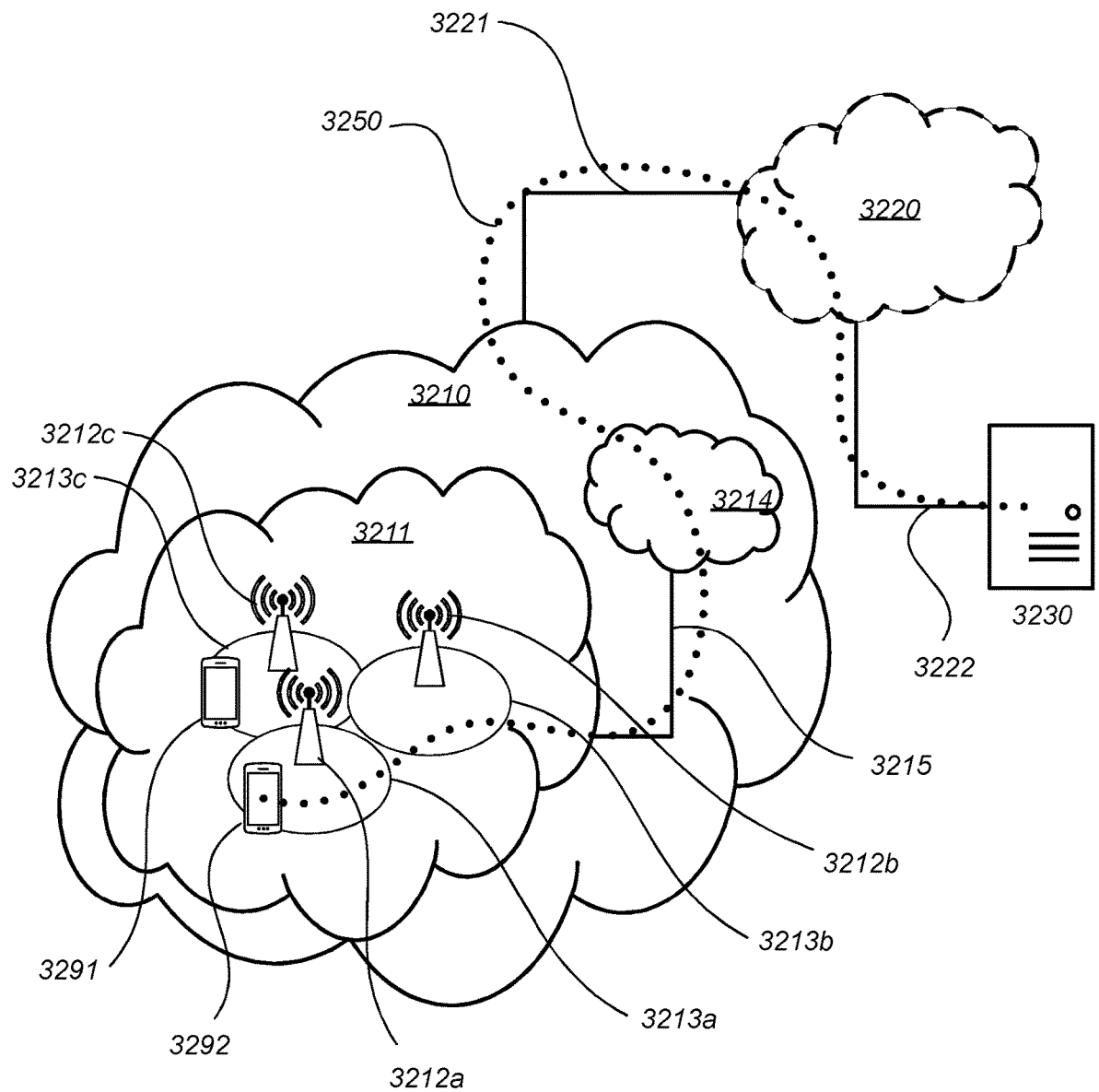
FIG. 8 schematically illustrates a telecommunication network connected via an intermediate network to a host computer.

With reference to FIG. 8, in accordance with an embodiment, a communication system includes a telecommunication network 3210 such as the wireless communications network 100, e.g. a WLAN, such as a 3GPP-type cellular network, which comprises an access network 3211, such as a radio access network, e.g. the RAN 101, and a core network 3214, e.g. the CN 102. The access network 3211 comprises a plurality of base stations 3212a, 3212b, 3212c, such as the network node 110, 111, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the wireless device 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220, e.g. the external network 200. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 9. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 9) served by the base station 3320. The communication interface 3326 may be configured to facilitate a connection 3360 to the host computer 3310. The connection 3360 may be direct or it may pass through a core network (not shown in FIG. 9) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 9:
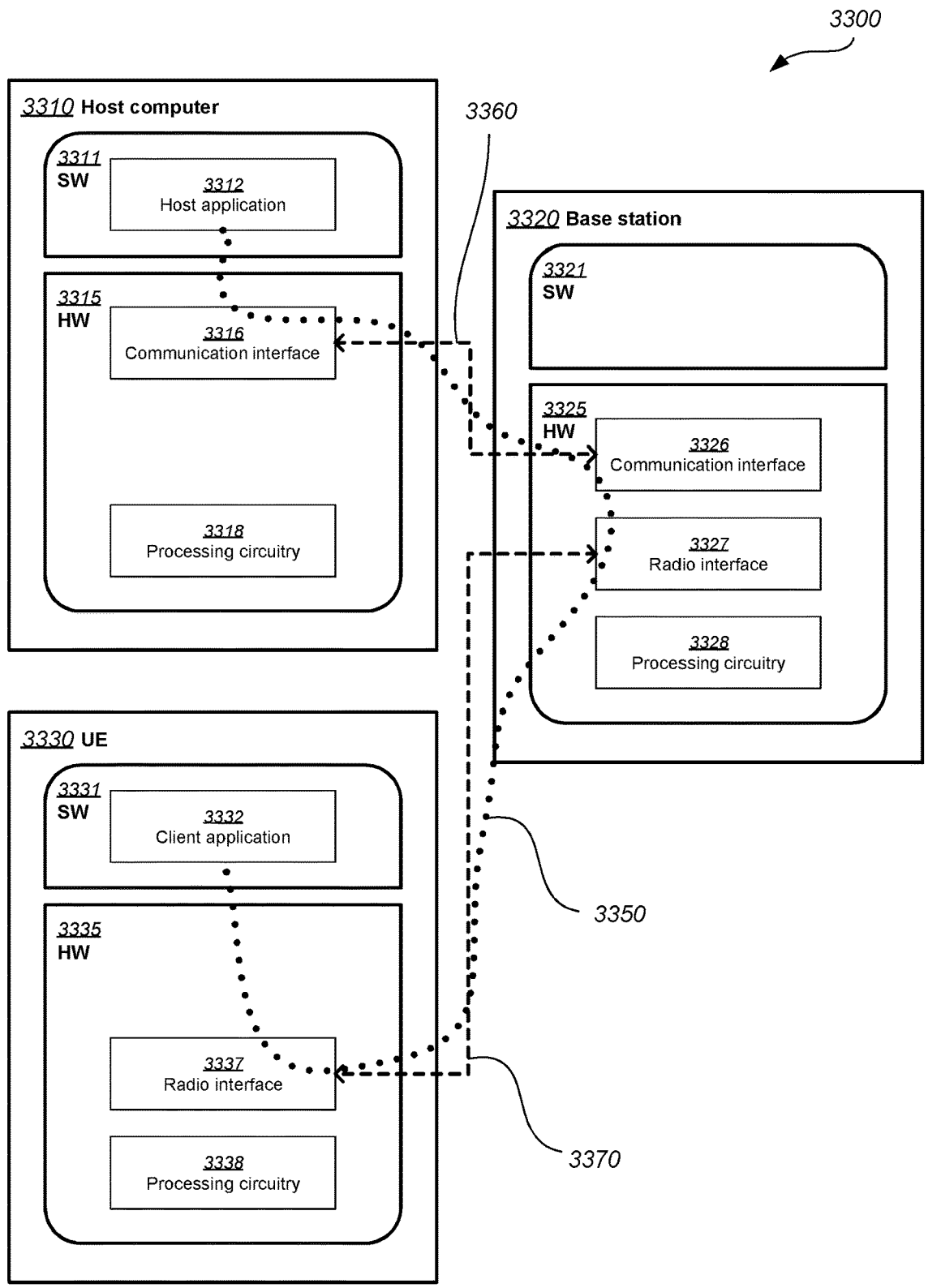
FIG. 9 is a generalized block diagram of a host computer communicating via a base station with a user equipment over a partially wireless connection.

It is noted that the host computer 3310, base station 3320 and UE 3330 illustrated in FIG. 9 may be identical to the host computer 3230, one of the base stations 3212a, 3212b, 3212c and one of the UEs 3291, 3292 of FIG. 8, respectively. This is to say, the inner workings of these entities may be as shown in FIG. 9 and independently, the surrounding network topology may be that of FIG. 8.

In FIG. 9, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may reduce the signaling overhead and thus improve the data rate. Thereby, providing benefits such as reduced user waiting time, relaxed restriction on file size, and/or better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 10 is a flowchart illustrating a method implemented in a communication system, in accordance with one embodiment. The communication system includes a host computer, a base station such as an AP STA, and a UE such as a Non-AP STA which may be those described with reference to FIGS. 8 and 9. For simplicity of the present disclosure, only drawing references to FIG. 10 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 11 is a flowchart illustrating a method implemented in a communication system, in accordance with one embodiment. The communication system includes a host computer, a base station such as an AP STA, and a UE such as a Non-AP STA which may be those described with reference to FIGS. 8 and 9. For simplicity of the present disclosure, only drawing references to FIG. 11 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 12 is a flowchart illustrating a method implemented in a communication system, in accordance with one embodiment. The communication system includes a host computer, a base station such as a AP STA, and a UE such as a Non-AP STA which may be those described with reference to FIGS. 8 and 9. For simplicity of the present disclosure, only drawing references to FIG. 12 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station such as a AP STA, and a UE such as a Non-AP STA which may be those described with reference to FIGS. 9 and 10. For simplicity of the present disclosure, only drawing references to FIG. 13 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Abbreviation Explanation

UE User Equipment
eNB Enhanced Node B, base station
LTE Long Term Evolution
3GPP 3rd Generation Partnership Project
DL Downlink
UL Uplink
4.5G 4 and half$^{th}$ generation of radio network
PMI Precoding Matrix Indicator
MIMO Multiple-Input Multiple-Output
TDD Time Division Duplexing
CSI-RS Channel Status Information-Reference Signal
RBS Radio Base Station
RBF Radial Basis Function
SVM Support Vector Machine
RAN Radio Access Network

The invention claimed is:

1. A method performed in a radio network node for transmission of a downlink signal in a wireless communications network supporting beamforming, wherein the method comprises:
   estimating uplink channel information for a radio link from a wireless device to the radio network node, wherein the wireless device is operating within a radio cell sector comprised in the wireless communications network;
   obtaining downlink beamforming information applicable for the radio cell sector and related to the estimated uplink channel information, wherein the downlink beamforming information is obtained from a machine learning unit and is determined from relationships, between beamforming information and uplink channel information, that are determined based on stored pairs of reported downlink beamforming information and measured uplink channel information; and transmitting, towards the wireless device, a beamformed downlink signal using the obtained downlink beamforming information.

2. The method of claim 1, comprising:
triggering the wireless device to report downlink beamforming information used in transmission of one or more downlink signals, by the radio network node, that are received by the wireless device;
obtaining the reported downlink beamforming information from the wireless device;
measuring uplink channel information based on one or more uplink signals transmitted using the radio link from the wireless device to the radio network node; and
storing, in association with the machine learning unit, one or more pairs of reported downlink beamforming information and measured uplink channel information wherein each pair comprises reported downlink beamforming information and corresponding measured uplink channel information for the radio link.

3. The method of claim 1, wherein the triggering and the measuring are performed during a selected period of time.

4. The method of claim 1, further comprising training the machine learning unit, via neural network methods based on the stored pairs of reported downlink beamforming information and measured uplink channel information, to determine the relationships between beamforming information and uplink channel information.

5. The method of claim 1, wherein
the estimated uplink channel information is associated with a carrier frequency $f_0$ for the radio link, and
the obtained output downlink beamforming information is associated with a target frequency $f_1$ for the radio link.

6. A method for a machine learning unit for a wireless communications network that is configured to support transmission of downlink signals via beamforming, wherein the method comprises:
performing a neural network training method on stored pairs of reported downlink beamforming information and measured uplink channel information to determine relationships between downlink beamforming information and uplink channel information;
retrieving downlink beamforming information related to received estimated uplink channel information for a radio link between a wireless device and a radio network node, wherein the downlink beamforming information is retrieved based on the determined relationships and wherein the downlink beamforming information is applicable for a radio cell sector comprised in the wireless communications network; and
providing the obtained downlink beamforming information to a radio network node, thereby supporting the radio network node to transmit, towards the wireless device operating within the radio cell sector, a beamformed downlink signal using the downlink beamforming information.

7. The method of claim 6, wherein:
the neural network training method is performed using a neural network that is specific for the radio cell sector or a plurality of radio cell sectors including the radio cell sector; and
the neural network comprises an input layer, an output layer and one or more hidden layers;
each of the layers comprises one or more artificial neurons linked to one or more other artificial neurons of the same layer or of another layer;
each of the one or more artificial neurons has an activation function, an input weighting coefficient, a bias, and an output weighting coefficient; and
the weighting coefficients and the bias are changeable during training of the neural network.

8. The method of claim 6, wherein performing the neural network training method comprises:
providing a known pair to the neural network, wherein the known pair includes known uplink channel information and corresponding known downlink beamforming information; and
for one or more of the artificial neurons, adjusting one or more of the input weighting coefficients, biases, and output weighting coefficients until the known downlink beamforming information is output from the neural network responsive to the corresponding known uplink channel information as an input to the neural network.

9. The method of claim 6, wherein performing the neural network training method comprises, for one or more of the artificial neurons, calculating one or more of the input weighting coefficients, biases, and output weighting coefficients by executing a back propagation algorithm or a genetic algorithm on stored pairs of reported downlink beamforming information and measured uplink channel information.

10. The method of claim 6, wherein:
the estimated uplink channel information is associated with a carrier frequency $f_0$ for the radio link, and
the obtained output downlink beamforming information is associated with a target frequency $f_1$ for the radio link.

11. A radio network node configured for transmission of a downlink signal in a wireless communications network arranged to support beamforming, wherein the radio network node comprises:
a wireless transmitter/receiver configured for downlink/uplink communication in a radio cell sector of the wireless communication network; and
processing circuitry operably coupled to the wireless transmitter/receiver, whereby the processing circuitry and the wireless transmitter/receiver are configured to:
estimate uplink channel information for a radio link from a wireless device to the radio network node, wherein the wireless device is operating within a radio cell sector comprised in the wireless communications network;
obtain downlink beamforming information applicable for the radio cell sector and related to the estimated uplink channel information, wherein the downlink beamforming information is obtained from a machine learning unit and is determined from relationships, between beamforming information and uplink channel information, that are determined based on stored pairs of reported downlink beamforming information and measured uplink channel information; and
transmit, towards the wireless device, a beamformed downlink signal using the obtained downlink beamforming information.

12. The radio network node of claim 11, wherein the processing circuitry and the wireless transmitter/receiver are further configured to:
trigger the wireless device to report downlink beamforming information used in transmission of one or more downlink signals, by the radio network node, that are received by the wireless device;
obtain the reported downlink beamforming information from the wireless device;

measure uplink channel information based on one or more uplink signals transmitted using the radio link from the wireless device to the radio network node; and store, in association with the machine learning unit, one or more pairs of reported downlink beamforming information and measured uplink channel information wherein each pair comprises reported downlink beamforming information and corresponding measured uplink channel information for the radio link.

13. The radio network node of claim 11, wherein the processing circuitry and the wireless transmitter/receiver are further configured to trigger the wireless device and measure the uplink channel information during a selected period of time.

14. The radio network node of claim 11, wherein the processing circuitry and the wireless transmitter/receiver are further configured to train the machine learning unit, via neural network methods based on the stored pairs of reported downlink beamforming information and measured uplink channel information, to determine the relationships between beamforming information and uplink channel information.

15. The radio network node of claim 11, wherein
the estimated uplink channel information is associated with a carrier frequency $f_0$ for the radio link, and
the obtained output downlink beamforming information is associated with a target frequency $f_1$ for the radio link.

16. A machine learning unit for a wireless communications network that is configured to support transmission of downlink signals via beamforming, wherein the machine learning unit comprises processing circuitry configured to:
perform a neural network training method on stored pairs of reported downlink beamforming information and measured uplink channel information to determine relationships between downlink beamforming information and uplink channel information;
retrieve downlink beamforming information related to received estimated uplink channel information for a radio link between a wireless device and a radio network node, wherein the downlink beamforming information is retrieved based on the determined relationships and wherein the downlink beamforming information is applicable for a radio cell sector comprised in the wireless communications network; and
provide the obtained downlink beamforming information to a radio network node, thereby supporting the radio network node to transmit, towards the wireless device operating within the radio cell sector, a beamformed downlink signal using the downlink beamforming information.

17. The machine learning unit of claim 16, wherein:
the processing circuitry is configured to perform the neural network training method using a neural network that is specific for the radio cell sector or a plurality of radio cell sectors including the radio cell sector; and
the neural network comprises an input layer, an output layer and one or more hidden layers;
each of the layers comprises one or more artificial neurons linked to one or more other artificial neurons of the same layer or of another layer;
each of the one or more artificial neurons has an activation function, an input weighting coefficient, a bias, and an output weighting coefficient; and
the weighting coefficients and the bias are changeable during training of the neural network.

18. The machine learning unit of claim 16, wherein the processing circuitry is configured to perform the neural network training method by:
providing a known pair to the neural network, wherein the known pair includes known uplink channel information and corresponding known downlink beamforming information; and
for one or more of the artificial neurons, adjusting one or more of the input weighting coefficients, biases, and output weighting coefficients until the known downlink beamforming information is output from the neural network responsive to the corresponding known uplink channel information as an input to the neural network.

19. The machine learning unit of claim 16, wherein the processing circuitry is configured to perform the neural network training method by, for one or more of the artificial neurons, calculating one or more of the input weighting coefficients, biases, and output weighting coefficients by executing a back propagation algorithm or a genetic algorithm on stored pairs of reported downlink beamforming information and measured uplink channel information.

20. The machine learning unit of claim 16, wherein:
the estimated uplink channel information is associated with a carrier frequency $f_0$ for the radio link, and
the obtained output downlink beamforming information is associated with a target frequency $f_1$ for the radio link.

* * * * *